US011514823B2

(12) United States Patent
Shin

(10) Patent No.: US 11,514,823 B2
(45) Date of Patent: Nov. 29, 2022

(54) FLEXIBLE DISPLAY DEVICE

(71) Applicant: LG ELECTRONICS INC., Seoul (KR)

(72) Inventor: Min Chui Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/225,771

(22) Filed: Apr. 8, 2021

(65) Prior Publication Data

US 2022/0238047 A1    Jul. 28, 2022

(30) Foreign Application Priority Data

Jan. 26, 2021 (WO) ................. PCT/KR2021/001036

(51) Int. Cl.
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC ............................... G06F 1/1652; G09F 9/301
See application file for complete search history.

(56) References Cited

U.S. PATENT DOCUMENTS

| 7,353,053 | B2* | 4/2008 | Prichard | ............. | H04M 1/0237 |
| | | | | | 455/90.3 |
| 10,747,269 | B1* | 8/2020 | Choi | ..................... | G06F 1/1641 |
| 11,051,413 | B2* | 6/2021 | Yang | ..................... | G06F 1/1626 |
| 11,058,018 | B1* | 7/2021 | Yoon | ..................... | H05K 5/0217 |
| 11,315,447 | B2* | 4/2022 | Feng | ..................... | G06F 1/1652 |
| 2013/0058063 | A1* | 3/2013 | O'Brien | ................ | G06F 1/1624 |
| | | | | | 361/807 |
| 2020/0033913 | A1* | 1/2020 | Yang | ..................... | G06F 1/1624 |
| 2020/0170129 | A1 | 5/2020 | Han et al. | | |
| 2020/0314225 | A1* | 10/2020 | Ahn | ..................... | G06F 1/1637 |
| 2020/0363841 | A1* | 11/2020 | Kim | ..................... | G06F 1/1624 |
| 2020/0409421 | A1* | 12/2020 | Cho | ..................... | H01L 51/0097 |

(Continued)

FOREIGN PATENT DOCUMENTS

| EP | 3702880 | 9/2020 |
| KR | 1020110082943 | 7/2011 |

(Continued)

OTHER PUBLICATIONS

Dialog Search Report (Year: 2022).*

(Continued)

*Primary Examiner* — Hung S. Bui
*Assistant Examiner* — Sagar Shrestha
(74) *Attorney, Agent, or Firm* — Lee, Hong, Degerman, Kang & Waimey PC

(57) ABSTRACT

A flexible display device is disclosed. The flexible display device includes a first body, a second body, a flexible display, a first rack, a second rack, a first gear, and a second gear. The first gear and the second gear rotate in conjunction with each other. The flexible display is divided into a first region and a second region, and the second rack forms a continuous loop together with the second region of the flexible display. Accordingly, when the second body slides with respect to the first body, tension can be stably applied to the flexible display, and the flexible display is prevented from being loosened.

19 Claims, 14 Drawing Sheets

(56) References Cited

U.S. PATENT DOCUMENTS

2021/0181801 A1* 6/2021 Yin ................... G06F 1/1652
2021/0373603 A1* 12/2021 Feng .................. G06F 1/1624
2021/0375165 A1* 12/2021 Feng .................. G06F 1/1652

FOREIGN PATENT DOCUMENTS

| KR | 1020190004618 | 1/2019 |
| KR | 1020190062855 | 6/2019 |
| KR | 1020200013821 | 2/2020 |

OTHER PUBLICATIONS

PCT International Application No. PCT/KR2021/001036, International Search Report dated Oct. 22, 2021, 3 pages.
European Patent Office Application Serial No. 21167546.7, Search Report dated Oct. 1, 2021, 8 pages.

* cited by examiner

FLEXIBLE DISPLAY DEVICE

CROSS-REFERENCE TO RELATED APPLICATIONS

Pursuant to 35 U.S.C. § 119, this application claims the benefit of an earlier filing date and right of priority to International Application No. PCT/KR2021/001036, filed on Jan. 26, 2021, the contents of which are hereby incorporated by reference herein in its entirety.

FIELD

The present disclosure relates to a flexible display device including a flexible display and, more particularly, to a flexible display device characterized in that when two bodies move relative to each other, the surface area of the flexible display that is exposed to any one side thereof is changed.

BACKGROUND

With the development of flexible displays that can be bent while displaying image information thereon, research and development has been underway to provide a foldable device by applying a flexible display to a device having two bodies and a folding structure (for example, a hinge unit). In such a foldable device, since the flexible display may be disposed to completely cover the two bodies and the folding structure, a relatively large-sized display can be implemented in the device.

As another example of a device using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

As still another example of a device using a flexible display, there is a device in which as two bodies slide with respect to each other, a flexible display having a U-shape due to a curved middle portion thereof is deformed such that a surface area of the flexible display seen from any one side thereof changes.

In the device in which two bodies slide with respect to each other, if non-uniform tension is applied to the flexible display when the flexible display is deformed, the flexible display may be partially twisted or loosened.

In addition, such a device in which the two bodies slide with respect to each other may be generally kept for a relatively long time with the middle portion of the flexible display forming a U-shape. However, after the device has been kept for a relatively long time in such a state, when a user wants to deform the flexible device, the middle portion of the flexible display forming a U-shape may not be fully spread out, and a flat portion of the flexible display may not be completely curved into a U-shape. This deficiency may be because of plastic deformation occurring in a part of the flexible display, springback, and/or elasticity of the flexible display.

Accordingly, considering such characteristics of the flexible display caused by the deformation thereof, development of a flexible display device that works accurately and stably is required.

SUMMARY

An aspect of the present disclosure is directed to providing a flexible display device in which a flexible display is deformed as two bodies slide with respect to each other, the flexible display device including a means by which a predetermined tension is applied to the flexible display when a surface area of a portion of the flexible display that forms a single plane surface is increased and reduced.

Another aspect of the present disclosure is directed to providing a flexible display device in which a flexible display is deformed as two bodies slide with respect to each other, the flexible display device including a means by which a movement amount of the flexible display may be maintained constant over the entire section of the flexible display when the surface area of the portion of the flexible display that forms a single plane surface is increased and reduced.

Yet another aspect of the present disclosure is directed to providing a flexible display device in which a flexible display is deformed as two bodies slide with respect to each other, the flexible display device including a means by which tension applied to the flexible display may increase when the surface area of the portion of the flexible display that forms a single plane surface is increased, and by which the tension applied to the flexible display may decrease when the surface area of the portion of the flexible display that forms a single plane surface is reduced.

The flexible display device according to an aspect of the present disclosure may be formed to be held and carried by a user. That is, the flexible display device may be formed to have approximately the same size, the same shape, and the same weight as those of general mobile terminals.

In some embodiments, the flexible display device may include a first body, a second body, and a flexible display.

The second body may be formed to move relative to the first body in a direction parallel to a first direction. The second body may move relative to the first body in the first direction. The second body may move relative to the first body in a direction opposite to the first direction.

The first body may be formed to move relative to the second body in the direction parallel to the first direction. The first body may move relative to the second body in the direction opposite to the first direction. The first body may move relative to the second body in the first direction.

The second body may reciprocate between a first position and a second position in the direction parallel to the first direction, relative to the first body. The first position may be a relative position of the second body with respect to the first body, and the second position may also be a relative position of the second body with respect to the first body.

When the second body is in the first position relative to the first body, it can be said that the flexible display device is in a first state, and when the second body is in the second position relative to the first body, it can be said that the flexible display device is in a second state. Accordingly, in the description of the present disclosure, "the first position" may be used in the same sense as "the first state of the flexible display device," and "the second position" may be used in the same sense as "the second state of the flexible display device."

The direction from the first position toward the second position is the first direction.

The flexible display device may include a first edge portion and a second edge portion forming opposite edges of the flexible display device.

The first edge portion and the second edge portion may be formed to be parallel to each other, or to be substantially parallel to each other.

In one embodiment, the first edge portion may be fixed to the first body, and the second edge portion may be fixed to the second body. In another embodiment, the first edge portion may be formed integrally with the first body, and the second edge portion may be formed integrally with the second body.

In the embodiments of the present disclosure, various methods including welding, adhesion, forcible insertion, locking, interlocking, bolting, and riveting may be used for a "fixing" of elements.

When the first edge portion forms a lower side edge portion of the flexible display device, the second edge portion may form an upper side edge portion of the flexible display device.

A direction from the first edge portion to the second edge portion may be the first direction.

The first body may include a first support body.

The first support body may be formed along a second direction, which is a direction orthogonal to the first direction.

At least a portion of an outer surface of the first support body may form a curved surface. The portion of the outer surface of the first support body that forms a curved surface may support a curved portion of the flexible display.

In one embodiment of the present disclosure, the first support body may be formed integrally with the first body. In another embodiment, the first support body may be formed in the shape of a roller that can be rotated about a rotation axis extending along the second direction. That is, the first support body may be rotatably coupled to the first body.

The flexible display may include a first region and a second region.

The first region may be a region coupled to the second body. The first region may be fixedly coupled to the second body.

The first region may be fixed in front of the second body to face forward. The first region may form a front surface of the flexible display device. The first region may be formed as a plane surface. The first region may be parallel to the first direction and the second direction.

The second region may be a region extending from the first region. A portion of the second region may be curved. A portion of the second region may be curved into a semicircular shape, and as the second body moves, the position of the curved portion in the second region may be changed.

A surface area of the second region that forms a single plane surface with the first region may change as the second body moves.

When the second body moves in the first direction relative to the first body, the surface area of the second region that forms a single plane surface with the first region may increase. When the second body moves in the direction opposite to the first direction relative to the first body, the surface area of the second region that forms a single plane surface with the first region may decrease.

The second region may be curved about the first axis extending along the second direction, to form a curved surface. The second region may be curved around the first support body.

A portion of the second region may be curved about a curvature center line, which coincides with a central axis of the first support body, to form a curved surface.

The second region may include a first connected region and a second connected region.

The first connected region may be a region extending from the first region.

The second connected region may be a region extending from the first connected region.

When the second body is in the first position, the first connected region may be curved around the first support body to form a curved surface, and the second connected region may be parallel to the first region. When the second body is in the first position, the first connected region may be curved around the first support body to form a curved surface. When the second body is in the first position, the first connected region may form a curved surface of a semicircular shape about the curvature center line.

When the second body is in the second position, the first connected region may form a single plane surface with the first region, and a portion of the second connected region may be curved around the first support body, forming a curved surface. When the second body is in the second position, a portion of the second connected region may be curved around the first support body to form a curved surface. When the second body is in the second position, a portion of the second connected region may form a curved surface of a semicircular shape about the curvature center line.

According to one aspect of the present disclosure, the flexible display device may include a first rack, a second rack, a first gear, a second gear, and a driving motor.

The flexible display device may include a second support body.

The flexible display device may include a driving bracket and a driving shaft. The flexible display device may include a gear reducer.

An outer surface of the second support body may be formed to be uniform in shape along the second direction.

At least a portion of the outer surface of the second support body may form a curved surface. The portion of the outer surface of the second support body that forms a curved surface may support a curved portion of the second rack.

In one embodiment, the second support body may be formed integrally with the first body. In another embodiment, the second support body may be formed integrally with the driving bracket. In yet another embodiment, the second support body may be formed in the shape of a roller that can rotate about a rotation axis extending along the second direction. That is, the second support body may be rotatably coupled to the first body or the driving bracket.

Teeth may be repeatedly formed on the first rack along the direction parallel to the first direction. The first rack may be coupled to the second body.

Teeth may be repeatedly formed on the second rack along a direction orthogonal to the second direction. The second rack may be formed to be flexible so as to be curved about a second axis which is parallel to the first axis.

According to an aspect of the present disclosure, the second rack may form a continuous loop together with the second region. A combination of the second region and the second rack may form a continuous loop. In one embodiment, a mere combination of the second region and the second rack may form a continuous loop, and in another embodiment, a combination of the second region, the second rack, and another element(s) may form a continuous loop.

The "continuous loop" in the present disclosure may include a loop made by bending a long iron rod, string, cord, or the like and joining both ends thereof such that one end and the other end thereof are connected to each other. In addition, a closed loop and a continuous track may also be included in the "continuous loop."

The second rack may include a first coupling portion, a second coupling portion, and a flexible portion.

The first coupling portion and the second coupling portion may respectively form both end portions of the second rack, and the flexible portion may form a middle portion of the second rack to connect the first coupling portion and the second coupling portion to each other.

For the formation of the continuous loop, the first coupling portion may be coupled to any one side of the flexible display, and the second coupling portion may be coupled to the opposite one side of the flexible display.

The first coupling portion may be fixedly connected to the flexible display at a position adjacent to an end portion of the flexible display (that is, an end portion of the second region). The first coupling portion may be directly connected to the flexible display, or alternatively, may be connected to the flexible display by medium of an element.

The first coupling portion may be coupled to an edge of the second region.

The second coupling portion may be fixedly connected to the flexible display at a position adjacent to the middle portion of the flexible display (that is, a boundary between the first region and the second region). The second coupling portion may be directly connected to the flexible display, or alternatively, may be connected to the flexible display by medium of an element.

In one embodiment, the second coupling portion may be directly coupled to the second body, and may be connected (or coupled) to the flexible display by medium of the second body.

The teeth of the second rack may be formed in the flexible portion.

The first coupling portion may extend from the flexible portion to any one side or both sides along a direction or directions parallel to the second direction.

The flexible portion may be positioned at a left side or right side of a center line of the flexible display device that bisects the flexible display device along the first direction.

The first coupling portion may be extended from the flexible portion to beyond the center line.

The first rack may be formed along the center line.

The first gear may be configured to engage with the teeth of the first rack. The first gear may be rotatably coupled to the first body or the driving bracket. The first gear may be coupled to the driving shaft and rotate with the driving shaft.

The second gear may be configured to engage with the teeth of the second rack. The second gear may be rotatably coupled to the first body or the driving bracket. The second gear may be coupled to the driving shaft and rotate with the driving shaft.

The first gear and the second gear may rotate in the same direction.

The driving motor may be configured to rotate the first gear and the second gear. The first gear and the second gear may rotate in conjunction with each other.

According to one aspect of the present disclosure, a movement distance of the first rack per rotation of the first gear in the first direction or the opposite direction of the first direction may be the same as a movement distance of the second rack per rotation of the second gear in the first direction or the opposite direction of the first direction.

According to one aspect of the present disclosure, a movement rate of the first rack in the first direction or the opposite direction of the first direction may be the same as a movement rate of the second rack in the first direction or the opposite direction of the first direction.

According to one aspect of the present disclosure, the movement distance of the second rack per rotation of the second gear in the first direction or the opposite direction of the first direction may be smaller than the movement distance of the first rack per rotation of the first gear in the first direction or the opposite direction of the first direction.

According to one aspect of the present disclosure, when a rotation speed of the first gear and a rotation speed of the second gear are the same as each other, a distance between two adjacent teeth of the first rack is d1, a distance between two adjacent teeth of the second rack is d2, the total number of teeth of the first gear is n1, and the total number of teeth of the second gear is n2, n1×d1 may be greater than n2×d2.

The teeth of the first rack may be formed on a surface of the first rack opposite to a surface of the first rack to which the second body is coupled.

The teeth of the second rack may be formed on an inner surface of the second rack.

A portion of the second rack that engages with the second gear may be parallel to the first rack.

The driving bracket may be configured to receive the first rack, the second rack, and the driving motor. The driving bracket may be fixed to the first body.

The driving bracket may include a first guide groove and a second guide groove.

The first guide groove may be formed in the shape of a concave groove at one side of the driving bracket. The first guide groove may support both edges of the first rack such that the first rack slides through the first guide groove.

The second guide groove may be formed in the shape of a concave groove at one side of the driving bracket. The second guide groove may be formed beside the first guide groove to be adjacent thereto. The second guide groove may support both edges of the second rack such that the second rack slides through the second guide groove.

The driving shaft may be formed to be parallel to the second direction and may be rotated by the driving motor. The driving shaft may be coaxially coupled to the first gear and the second gear.

The gear reducer may be received in the driving bracket, and may be configured to transfer driving force of the driving motor to the driving shaft.

The flexible display device may include a plurality of support bars.

The plurality of support bars may be formed to extend in a direction that is parallel to the second direction. The plurality of support bars may be configured to support an inner surface of the second region.

Each of the plurality of support bars may include a first support slider, a second support slider, and a connection arm.

The first support slider may form one end portion of a support bar.

The second support slider may form the other end portion of the support bar at the opposite side of the first support slider.

The connection arm may connect the first support slider to the second support slider and may support the second region.

The first body may include a first movement guide groove and a second movement guide groove.

The first movement guide groove may be formed as a U-shaped groove, and may form a path into which the first support slider is inserted and through which the first support slider moves.

The second movement guide groove may be formed as a U-shaped groove, and may form a path into which the second support slider is inserted and through which the second support slider moves.

The flexible display device may include a connection frame.

The connection frame may be fixedly coupled to the second region along an edge of the second region that is parallel to the second direction, and may serve as a medium to connect the flexible display with the second rack.

The flexible display device according to the embodiments of the present disclosure may include the first rack, the second rack, the first gear, and the second gear. The first gear and the second gear may rotate in conjunction with each other and may rotate in the same direction as each other. The second rack may form the shape of a continuous loop with the second region of the flexible display. When the flexible display is deformed as the second body moves relative to the first body, the second body and the flexible display may be moved relative to the first body by the first rack and the first gear, and the flexible display may be moved relative to the first body by the second rack and the second gear. Accordingly, when the surface area of the flexible display that forms a single plane surface increases and decreases, a predetermined tension may be applied to the entire section of the flexible display, and thus, the flexible display may be maintained in a relatively more stable state.

In the flexible display device according to an embodiment of the present disclosure, the movement distance of the first rack per rotation of the first gear in the first direction or the opposite direction of the first direction may be the same as the movement distance of the second rack per rotation of the second gear in the first direction or the opposite direction of the first direction. Accordingly, when the surface area of the flexible display that forms a single plane surface increases and decreases, the amount of movement of the flexible display may be constant over the entire section of the flexible display, and a constant tension may be maintained.

In the flexible display device according to another embodiment of the present disclosure, the movement distance of the second rack per rotation of the second gear in the first direction or the opposite direction of the first direction may be smaller than the movement distance of the first rack per rotation of the first gear in the first direction or the opposite direction of the first direction. Accordingly, when the surface area of the flexible display that forms a single plane surface increases, the tension applied to the flexible display may increase, and thus the flexible display may be prevented from being loosened. Also, when the surface area of the flexible display that forms a single plane surface decreases, the tension applied to the flexible display may decrease, and thus the load caused by the operation may be reduced.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIGS. 11a and 11b illustrate a first body with broken lines.

FIGS. 12a and 12b illustrate the first body with broken lines.

DETAILED DESCRIPTION

Figure 1:
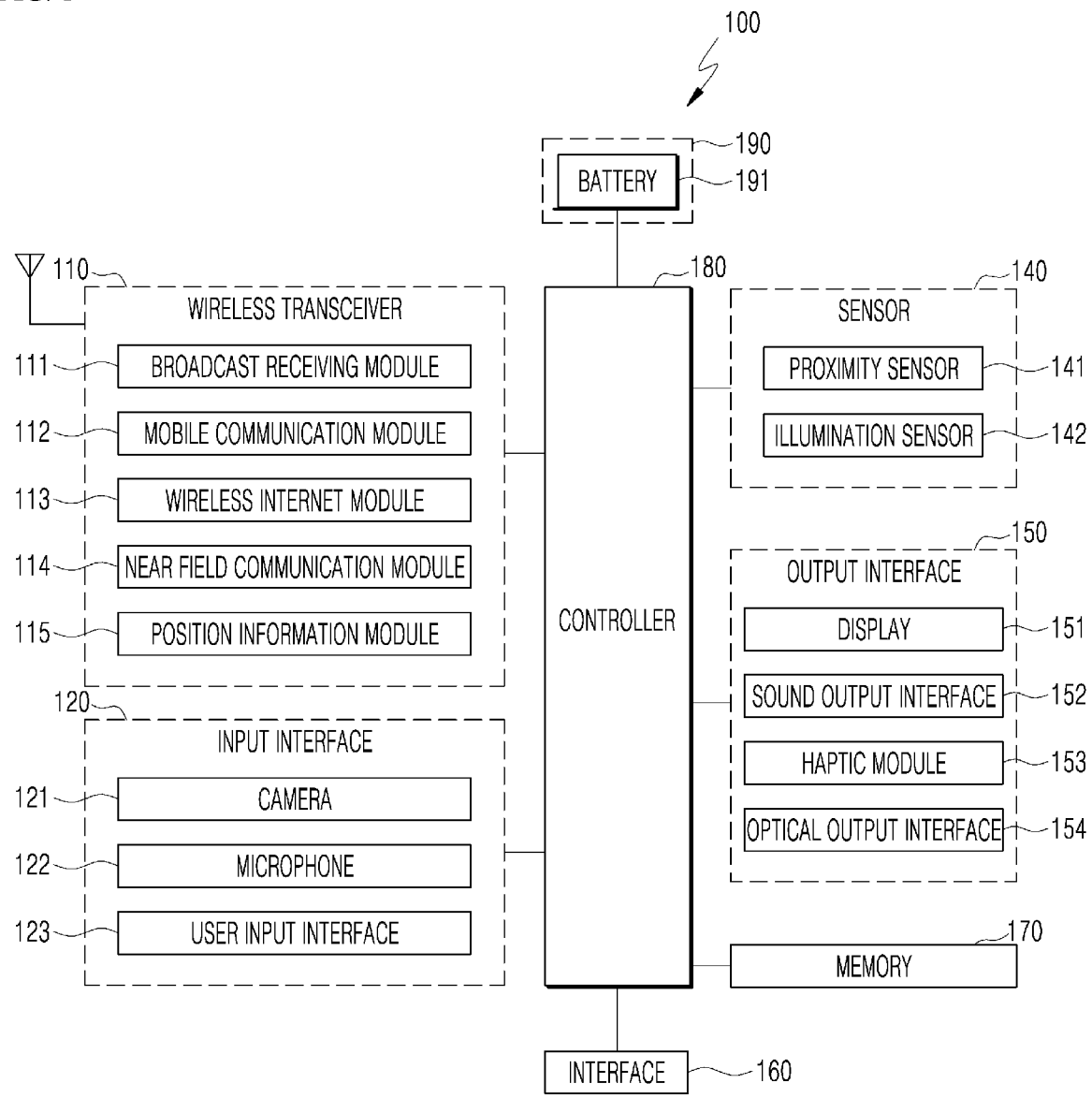
FIG. 1 is a block diagram for explaining a flexible display device.

Hereinafter, exemplary embodiments disclosed herein will be described in detail with reference to the accompanying drawings, and like reference numerals designate like elements, and redundant description thereof will be omitted. Suffixes "module" and "unit or portion" for elements used in the following description are merely provided for facilitation of preparing this specification, and thus they are not granted a specific meaning or function. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, and the like, may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The singular expressions include plural expressions unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A flexible display device (also referred to as a 'display device') described in the present specification may include a mobile terminal such as a portable phone, a smartphone, a laptop computer, a digital broadcasting terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiment disclosed in the present specification may be applied to a fixed terminal such as a digital TV, a desktop computer, a digital signage except for an example that is applied only to a mobile terminal. Hereinafter, in the present disclosure, for the convenience of description, the mobile terminal will be first described as an example of the display device.

FIG. 1 is a block diagram for explaining a mobile terminal 100 according to the present disclosure.

The mobile terminal 100 may include, for example, a wireless transceiver 110, an input interface 120, a sensor 140, an output interface 150, an interface 160, a memory 170, a controller 180, and a power supply 190. The components shown in FIG. 1 are not essential to implement the mobile terminal, and the mobile terminal described in the present disclosure may include more or fewer components than the components described above.

More specifically, the wireless transceiver 110 may include one or more modules that enable wireless communication between the mobile terminal 100 and a wireless communication system, between the mobile terminal 100 and another mobile terminal 100, or between the mobile terminal 100 and an external server. Further, the wireless transceiver 110 may include one or more modules that connect the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or an image input interface that inputs an image signal, a microphone 122 or an audio input interface that inputs an audio signal, and a user input interface 123 (for example, a touch key or a mechanical key) that receives information from a user. Voice data or image data collected by the input interface 120 may be analyzed and processed as a control command of the user.

The sensor 140 may include one or more sensors that sense at least one of information in the mobile terminal, surrounding environment information around the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), or a chemical sensor (for example, an electronic nose, a healthcare sensor, and a biometric sensor). Further, the mobile terminal disclosed in the present specification may combine and utilize information sensed by at least two sensors from the above-mentioned sensors.

The output interface 150 generates outputs related to visual, auditory, or tactile senses, and may include at least one of a display 151, a sound output interface 152, a haptic module 153, or an optical output interface 154. The display 151 forms a mutual layered structure with a touch sensor, or is formed integrally to be implemented as a touch screen. The touch screen simultaneously may serve as a user input interface 123 that provides an input interface between the mobile terminal 100 and the user while providing an output interface between the mobile terminal 100 and the user.

The interface 160 serves as a passage between the mobile terminal 100 and various types of external devices that are connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. As the external device is connected to the interface 160, the mobile terminal 100 may perform appropriate control on the connected external device.

Further, the memory 170 may store data that supports various functions of the mobile terminal 100. The memory 170 may store a plurality of application programs (or applications) driven in the mobile terminal, and data and commands for operations of the mobile terminal 100. At least some of the application programs may be downloaded from an external server through wireless communication. Further, at least some of the application programs for the basic functions of the mobile terminal 100 (for example, functions for receiving and making calls and receiving and sending messages) may be provided in the mobile terminal 100 from the time of manufacture. The application programs may be stored in the memory 170, and may be installed on the mobile terminal 100 so as to be driven by the controller 180 to perform operations (or functions) of the mobile terminal.

In addition to the operations related to the application programs, the controller 180 may generally control overall operation of the mobile terminal 100. The controller 180 may process a signal, data, or information that is inputted or outputted through the above-described components or drive the application programs stored in the memory 170 to provide or process appropriate information or functions to the user.

Further, in order to drive the application programs stored in the memory 170, the controller 180 may control at least some of components described with reference to FIG. 1. Moreover, the controller 180 may combine and operate at least two of components included in the mobile terminal 100 to drive the application programs.

Under the control of the controller 180, the power supply 190 may be supplied with external power or internal power, and supply power to each component included in the mobile terminal 100. The power supply 190 includes a battery, which may be a built-in battery or a replaceable battery.

At least some of the above-described components may operate in cooperation with each other to implement the operation, the control, or the control method of the mobile terminal according to various embodiments which will be described below. Further, the operation, the control, or the control method of the mobile terminal may be implemented on the mobile terminal by driving at least one application program stored in the memory 170.

Hereinafter, prior to describing various embodiments implemented by the mobile terminal 100 described above, the above-mentioned components will be described in more detail with reference to FIG. 1.

The broadcast receiving module 111 of the wireless transceiver 110 receives a broadcast signal and/or broadcast-related information from an external broadcast management server through a broadcast channel. The broadcast channel may include a satellite channel and a ground wave channel. Two or more broadcast receiving modules for simultaneous broadcast reception or broadcast channel switching for at least two broadcast channels may be provided to the mobile terminal 100.

The broadcast management sever may refer to a server that generates and transmits a broadcast signal and/or broadcast-related information or a server that is supplied with the previously generated broadcast signal and/or broadcast-related information to transmit the broadcast signal and/or the broadcast-related information to the terminal. The broadcast signal may include not only a TV broadcast signal, a radio broadcast signal, and a data broadcast signal, but also a broadcast signal obtained by combining the TV broadcast signal or the radio broadcast signal with the data broadcast signal.

The broadcast signal may be encoded according to at least one of technical standards (or broadcast schemes, for example, ISO, IEC, DVB, or ATSC) for transmitting and receiving a digital broadcast signal, and the broadcast receiving module 111 may receive the digital broadcast signal using an appropriate method for the technical specification defined by the technical standards.

The broadcast-related information may refer to information related to a broadcast channel, a broadcast program, or a broadcast service provider. The broadcast-related information may also be provided over the mobile communication network. In this case, the broadcast-related information may be received by the mobile communication module 112.

The broadcast-related information may exist in various types, such as an electronic program guide (EPG) of a digital multimedia broadcast (DMB) or an electronic service guide (ESG) of a digital video broadcast-handheld (DVB-H). The broadcast signal and/or the broadcast-related information received by the broadcast receiving module 111 may be stored in the memory 170.

The mobile communication module 112 may transmit/receive a wireless signal to/from at least one of a base station, an external terminal, or a server over a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A).)

The wireless signal may include a voice call signal, a video call signal, or various types of data in accordance with transmission or reception of a text/multimedia message.

The wireless internet module 113 refers to a module for wireless internet connection, and may be embodied in the mobile terminal 100 or installed at the outside of the mobile terminal 100. The wireless internet module 113 may be configured to transmit/receive a wireless signal over a communication network according to wireless internet technologies.

The wireless internet technologies include, for example, wireless LAN (WLAN), wireless fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), and long term evolution-advanced (LTE-A). The wireless internet module 113 may transmit or receive data in accordance with at least one wireless internet technology within a range including internet technology that have not been described above.

From the viewpoint that the wireless internet connection through, for example, WiBro, HSDPA, HSUPA, GSM, CDMA, WCDMA, LTE, and LTE-A is performed over the mobile communication network, the wireless internet module 113 that performs the wireless internet connection over the mobile communication network may be understood as a type of the mobile communication module 112.

The near field communication module 114 is for short range communication, and may support the short range communication using at least one of Bluetooth™, radio frequency identification (RFID), infrared data association (IrDA), ultra-wideband (UWB), ZigBee, Near Field Communication (NFC), wireless fidelity (Wi-Fi), Wi-Fi Direct, or Wireless Universal Serial Bus (Wireless USB). The near field communication module 114 may support wireless communication between the mobile terminal 100 and the wireless communication system, between the mobile terminal 100 and the other mobile terminal 100, or between the mobile terminal 100 and a network in which the other mobile terminal 100 (or external server) is located, over the wireless local area network. The wireless local area network may be a wireless personal area network.

Here, the other mobile terminal 100 may be a wearable device (for example, a smart watch, a smart glass, or a head mounted display (HMD)) that is capable of exchanging data (or interworking) with the mobile terminal 100 according to the present disclosure. The near field communication module 114 may detect (or recognize) the wearable device that is capable of communicating with the mobile terminal 100, in the vicinity of the mobile terminal 100. Moreover, when the detected wearable device is authenticated to communicate with the mobile terminal 100 according to the present disclosure, the controller 180 may transmit at least a portion of data processed in the mobile terminal 100 to the wearable device through the near field communication module 114. Therefore, the user of the wearable device may use the data processed in the mobile terminal 100, through the wearable device. For example, according to this, when a phone call is received by the mobile terminal 100, the user may make a phone call through the wearable device, or when a message is received by the mobile terminal 100, the user may check the received message through the wearable device.

The position information module 115 is a module for obtaining a position (or a current position) of a mobile terminal, and its representative examples include a global positioning system (GPS) module or a wireless fidelity (Wi-Fi) module. For example, when the GPS module is utilized, the mobile terminal may obtain the position of the mobile terminal using a signal transmitted from the GPS satellite. As another example, when the Wi-Fi module is utilized, the mobile terminal may obtain the position of the mobile terminal based on information on a wireless access point (AP) that transmits and receives wireless signals with the Wi-Fi module. If necessary, the position information module 115 may alternatively or additionally perform a function of another module of the wireless transceiver 110 to obtain data on the position of the mobile terminal. The position information module 115 is a module used to obtain the position (or the current position) of the mobile terminal, and is not limited to a module that directly calculates or obtains the position of the mobile terminal.

Next, the input interface 120 is for inputting video information (or signal), audio information (or signal), data, or information inputted by the user, and the mobile terminal 100 may include one or a plurality of cameras 121 to input the video information. The camera 121 processes an image frame such as a still or moving image obtained by an image sensor in a video call mode or a photographing mode. The processed image frame may be displayed on the display 151 or stored in the memory 170. Further, the plurality of cameras 121 included in the mobile terminal 100 may be arranged to form a matrix structure, and a plurality of pieces of image information having various angles or focal points may be inputted to the mobile terminal 100 through the cameras 121 that form the matrix structure. Further, the plurality of cameras 121 may be arranged to form a stereo structure to obtain left and right images used to implement a stereoscopic image.

The microphone 122 processes an external sound signal as electrical speech data. The processed voice data may be utilized in various manners in accordance with the function (or an application program that is being executed) that is being performed by the mobile terminal 100. Various noise removal algorithms for removing noise generated during the process of receiving the external sound signal may be implemented in the microphone 122.

The user input interface 123 is for receiving information from the user, and when the information is inputted through the user input interface 123, the controller 180 may control the operation of the mobile terminal 100 so as to correspond to the inputted information. The user input interface 123 may include a mechanical input interface (or a mechanical key, for example, a button located on a front, rear, or side surface of the mobile terminal 100, a dome switch, a jog wheel, a jog switch, etc.) and a touch type input interface. For example, the touch type input interface may be formed as a virtual key, a soft key, or a visual key that is displayed on the touch screen through a software process, or a touch key that is disposed on a part other than the touch screen. The virtual key or visual key may be displayed on the touch screen in various shapes, and, for example, may be formed as graphics, text, icons, video, or a combination thereof.

The sensor 140 senses at least one of information in the mobile terminal, surrounding environment information around the mobile terminal, or user information, and generates a sensing signal corresponding to the information. The controller 180 may control the driving or the operation of the mobile terminal 100 or perform data processing, functions, or operations related to the application program installed in the mobile terminal 100, based on the sensing signal. Representative sensors among various sensors that may be included in the sensor 140 will be described in more detail below.

First, the proximity sensor 141 refers to a sensor that senses the presence of an object approaching a predetermined sensing surface or nearby objects, using an electromagnetic field force or infrared ray without any mechanical contact. The proximity sensor 141 may be disposed in an internal area of the mobile terminal that is enclosed by the above-described touch screen or in the vicinity of the touch screen.

Examples of the proximity sensor 141 may include, for example, a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect the proximity of an object with a change in the electric field in accordance with the proximity of the object having conductivity. In this case, the touch screen (or the touch sensor) itself may be classified as a proximity sensor.

For convenience of description, when the object approaches the touch screen without contacting the touch screen, and it is recognized that the object is located over the touch screen, it is referred to as a "proximity touch". When the object actually touches the touch screen, it is referred to as a "contact touch". A position at which the object proximately touches the touch screen refers to a position at which the object vertically corresponds to the touch screen when the object proximately touches the touch screen. The proximity sensor 141 may sense the proximity touch and a proximity touch pattern (for example, a proximate touch distance, a proximate touch direction, a proximate touch speed, a proximate touch time, a proximate touch position, and a proximate touch movement state). As described above, the controller 180 may process data (or information) corresponding to the proximate touch operation and the proximate touch pattern sensed by the proximity sensor 141, and may further display visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor senses a touch (or a touch input) applied to the touch screen (or the display 151) using at least one of various touch types such as a resistive film type, a capacitive type, an infrared type, an ultrasonic type, and a magnetic field type.

For example, the touch sensor may be configured to convert a change in a pressure applied to a specific portion of the touch screen, or a capacitance generated in a specific portion, into an electrical input signal. The touch sensor may be configured to detect a position and area where a touch subject that applies a touch onto the touch screen is touched on the touch sensor, and a pressure and capacitance at the time of the touch. Here, the touch subject is an object that applies a touch to the touch sensor, and may include, for example, a finger, a touch pen, a stylus pen, and a pointer.

As described above, when there is the touch input to the touch sensor, corresponding signal(s) is transmitted to a touch controller. The touch controller processes the signal(s) and then transmits corresponding data to the controller 180. By doing this, the controller 180 may confirm which area of the display 151 is touched. Here, the touch controller may be a separate component from the controller 180, or may be the controller 180 itself.

The controller 180 may perform different control or the same control depending on a type of a touch subject that touches the touch screen (or a touch key provided other than the touch screen). Whether to perform the different or the same control depending on the type of touch subject may be determined in accordance with an operating state of the current mobile terminal 100 or an application program that is being executed.

The touch sensor and the proximity sensor that are described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information on a sensing object using an ultrasonic wave. The controller 180 may calculate a position of a wave generating source by using information sensed by the optical sensor and the plurality of ultrasonic sensors. The position of the wave generating source may be calculated using the property that light is much faster than the ultrasonic wave, that is, the time in which light reaches the optical sensor is much faster than the time in which the ultrasonic wave reaches the ultrasonic sensor. More specifically, the position of the wave generating source may be calculated using a time difference of the time of arrival of the ultrasonic wave with respect to light that serves as a reference signal.

As seen from the configuration of the input interface 120, the camera 121 includes at least one of a camera sensor (for example, a CCD and a CMOS), a photo sensor (or an image sensor), or a laser sensor.

The camera 121 and the laser sensor may be combined to sense a touch of a sensing object for a three-dimensional stereoscopic image. The photo sensor, which may be stacked on a display element, is configured to scan a motion of the sensing object proximate to the touch screen. More specifically, the photo sensor includes photo diodes and transistors (TR) in rows/columns so as to scan contents disposed on the photo sensor by using an electrical signal that changes in accordance with an amount of light applied to the photo diode. That is, the photo sensor calculates coordinates of the sensing object in accordance with a changed amount of light, and position information on the sensing object may be obtained through the coordinates.

The display 151 displays (outputs) information processed in the mobile terminal 100. For example, the display 151 may display execution screen information on an application program driven in the mobile terminal 100 and user interface (UI), or graphic user interface (GUI) information in accordance with the execution screen information.

Further, the display 151 may be configured as a stereoscopic display that displays a stereoscopic image.

A three-dimensional display type such as a stereoscopic type (a glass type), an autostereoscopic type (a glass-free type), and a projection type (a holographic type) may be applied to the stereoscopic display.

The sound output interface 152 may output audio data received from the wireless transceiver 110 or stored in the memory 170 in, for example, a call signal reception mode, a phone-call mode, a recording mode, a voice recognition mode, and a broadcasting reception mode. The sound output interface 152 may also output a sound signal (for example, a call signal reception sound and a message reception sound) related to a function performed in the mobile terminal 100. Such a sound output interface 152 may include, for example, a receiver, a speaker, and a buzzer.

The haptic module 153 may generate various tactile effects that the user may feel. A representative example of the tactile effect generated by the haptic module 153 may be vibration. For example, an intensity and pattern of the vibration generated in the haptic module 153 may be controlled by the selection of the user or a setting of the controller 180. For example, the haptic module 153 may compose different vibrations to output the composed vibrations, or sequentially output the different vibrations.

In addition to the vibration, the haptic module 153 may generate various tactile effects, such as effects by, for example, a pin arrangement that vertically moves to a contact skin surface, an injection force or a suction force of air through an injection port or a suction port, grazing on a skin surface, electrode contact, and stimulation of an electrostatic force or effects of reproducing a cold or hot sensation using a heat absorbing or heat emitting element.

The haptic module 153 may not only transmit a tactile effect by means of direct contact, but may also be implemented to allow the user to feel a tactile effect by muscular sensation of a finger or an arm. Two or more haptic modules 153 may be provided in accordance with a configuration aspect of the mobile terminal 100.

The optical output interface 154 outputs a signal for notifying occurrence of an event by using light from a light source of the mobile terminal 100. Examples of events generated in the mobile terminal 100 may include message reception, call signal reception, missed call, alarm, schedule notification, email reception, and information reception through an application.

The signal outputted from the optical output interface 154 is implemented as the mobile terminal emits single color or a plurality of color light on a front surface or a rear surface. When the mobile terminal senses the event confirmation of the user, the signal output may be completed.

The interface 160 serves as a passage with all external devices that are connected to the mobile terminal 100. The interface 160 receives data from the external device or is supplied with power from the external device to supply power to each component in the mobile terminal 100, or transmits data in the mobile terminal 100 to the external device. For example, the interface 160 may include, for example, a wired/wireless headset port, an external charger port, a wired/wireless data port, a memory card port, a port that connects a device equipped with an identification module, an audio input/output (I/O) port, a video input/output (I/O) port, and an earphone port.

The identification module is a chip in which various pieces of information for authenticating a usage right of the mobile terminal 100 is stored, and may include, for example, a user identity module (UIM), a subscriber identity module (SIM), and a universal subscriber identity module (USIM). A device (hereinafter, referred to as "identification device") equipped with the identification module may be manufactured as a smart card. Therefore, the identification device may be connected to the terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals or power inputted from the cradle may operate a signal for recognizing that the mobile terminal 100 is precisely mounted in the cradle.

The memory 170 may store a program for an operation of the controller 180, or temporarily store inputted/outputted data (for example, a phone book, a message, a still image, and a moving image). The memory 170 may store data related to vibrations or sounds of various patterns outputted when the touch is inputted onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory), a random access memory (RAM), a static random access memory (SRAM), a read-only memory (ROM), an electrically erasable programmable read-only memory (EEPROM), a programmable read only memory (PROM), a magnetic memory, a magnetic disk, or an optical disk. The mobile terminal 100 may operate in association with a web storage that performs a storage function of the memory 170 on the Internet.

As described above, the controller 180 may control an operation related to the application program and an overall operation of the mobile terminal 100. For example, when the state of the mobile terminal satisfies a predetermined condition, the controller 180 may execute or release a locking state that restricts an input of a control command of a user regarding the applications.

Further, the controller 180 may perform control and processing related to, for example, voice call, data communication, and video call, or may perform a pattern recognition process that may recognize a handwriting input or a picture drawing input performed on the touch screen as a text or an image, respectively. Moreover, the controller 180 may control any one or a combination of a plurality of components described above to implement various embodiments which will be described below, in the mobile terminal 100 according to the present disclosure.

Under the control of the controller 180, the power supply 190 is supplied with an external power or an internal power, and supplies power required for operating the components. The power supply 190 includes a battery, and the battery may be a chargeable embedded battery and be detachably coupled to a terminal body to be charged.

Further, the power supply 190 may include a connection port, and the connection port may be configured as one example of an interface 160 to which an external charger which supplies power to charge a battery is electrically connected.

As another example, the power supply 190 may be configured to wirelessly charge the battery without using the connection port. In this case, the power supply 190 may receive power from an external wireless power transmission device by using one or more of an inductive coupling scheme based on a self-induction phenomenon or a magnetic resonance coupling scheme based on an electromagnetic resonance phenomenon.

Various embodiments below may be implemented in a recording medium readable by a computer or a similar device using hardware, software, or a combination thereof, for example.

The display 151 displays (outputs) information processed in the mobile terminal 100. For example, the display 151 may display execution screen information on an application program driven in the mobile terminal 100 and user interface (UI), or graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, two or more displays 151 may be provided in accordance with an implementation type of the mobile terminal 100. In this case, a plurality of displays may be disposed to be spaced apart from each other or integrally disposed on one surface of the mobile terminal 100 or may be disposed on different surfaces.

The display 151 may include a touch sensor that senses a touch on the display 151 so as to receive the control command by the touch method. Therefore, when the touch is made on the display 151, the touch sensor senses the touch, and based on the touch, the controller 180 may generate a control command corresponding to the touch. Contents inputted by the touch method may be, for example, letters or numbers, or instructions or designated menu items in various modes.

The microphone 122 is configured to receive a voice of the user, or other sounds. The microphone 122 may be provided in a plurality of locations to receive stereo sounds.

The interface 160 serves as a passage through which the mobile terminal 100 is connected to the external device. For example, the interface 160 may be at least one of a connection terminal for connection with other devices (for example, an earphone or an external speaker), a port for near field communication (for example, an infrared port (IrDA port), a Bluetooth port, and a wireless LAN port) or a power supply terminal for supplying power to the mobile terminal 100. The interface 160 may be implemented as a socket type which accommodates an external card, such as a subscriber identity module (SIM), a user identity module (UIM), and a memory card for information storage.

At least one antenna for wireless communication may be provided in a terminal body. The antenna may be embedded in the terminal body or formed in a case. For example, the antenna which forms a part of the broadcast receiving module 111 (see FIG. 1) may be configured to be withdrawn from the terminal body. Alternatively, the antenna may be formed to be a film type to be attached onto an inner surface of a housing, or a case including a conductive material may serve as an antenna.

The terminal body includes the power supply 190 (see FIG. 1) which supplies power to the mobile terminal 100. The power supply 190 may be embedded in the terminal body, or may include a battery 191 which is configured to be detachable at the outside of the terminal body.

The battery 191 may be configured to be supplied with power through a power cable connected to the interface 160. Further, the battery 191 may be configured to be wirelessly chargeable by a wireless charging device. The wireless charging may be implemented by a self-induction scheme or a resonance scheme (magnetic resonance scheme).

An accessory which protects an outer appearance of the mobile terminal 100 or supports or extends the function thereof may be added to the mobile terminal 100. An example of the accessory may include a cover or a pouch which covers at least one surface of the mobile terminal 100 or accommodates the mobile terminal 100. The cover or the pouch may interwork with the display 151 to extend the function of the mobile terminal 100. Another example of the accessory may include a touch pen which supports or extends a touch input on the touch screen.

The display device 1 according to the embodiment of the present disclosure includes a flexible display 300 which is transformable by an external force.

The transformation may be at least one of warping, bending, folding, twisting, rolling, and spreading of the display module. The transformable display module may be referred to as a "flexible display". Here, the flexible display 300 may include a general flexible display, an electronic paper (e-paper), and a combination thereof.

A general flexible display 300 refers to a durable display which maintains characteristics of existing flat panel displays, and is manufactured on a thin and flexible substrate which can be warped, bent, folded, twisted, rolled, and spread like paper, is light in weight, and is not easily broken.

Further, electronic paper is a display technique to which characteristic of general ink are applied, but uses reflection light, which is different from existing flat panel displays. The electronic paper may change information using a twist ball or electrophoresis using a capsule.

Information displayed on the flexible display 300 may include visual information that is outputted on a curved surface. The visual information is implemented by independently controlling the light emission of unit pixels (sub pixels) disposed in a matrix. A unit pixel refers to a minimum unit which implements one color.

A part of the flexible display 300 may be not flat but may be bent. In this case, when an external force is applied to the flexible display 300, a part of the flexible display 300 may be deformed into a flat state, or a less bent state or a more bent state.

The flexible display 300 may be combined with a touch sensor to implement a flexible touch screen. When a touch is made on the flexible touch screen, the controller 180 (see FIG. 1) performs control corresponding to the touch input. The flexible touch screen is formed such that the touch input is sensed while a part of the flexible display 300 is spread or bent.

The display device 1 according to the modified example may include a deformation sensing means which senses deformation of the flexible display 300. The deformation sensing means may be included in the sensor 140 (see FIG. 1).

The deformation sensing means may be provided in the flexible display 300 or the body 200, and may sense information related to the deformation of the flexible display 300. Here, the information related to the deformation may be information on a deformation direction of the flexible display 300, information on how much the flexible display 300 is deformed, information on the position of the deformation, information on the time of the deformation, information on an acceleration at which the deformed flexible display 300 is restored, and the like. In addition to the above information, various other types of information which can be sensed due to the bending of the flexible display 300 may also be included.

Further, the controller 180 (see FIG. 1) may change information disposed on the flexible display 300 or generate a control signal for controlling a function of the display device 1, based on the information related to the deformation of the flexible display 300 sensed by the deformation sensing means.

The deformation of the state of the flexible display 300 is not limited to the deformation by the external force. For example, when a part of the flexible display 300 is unfolded, the part may be deformed to be bent by the command of the user or an application.

Figure 2A:
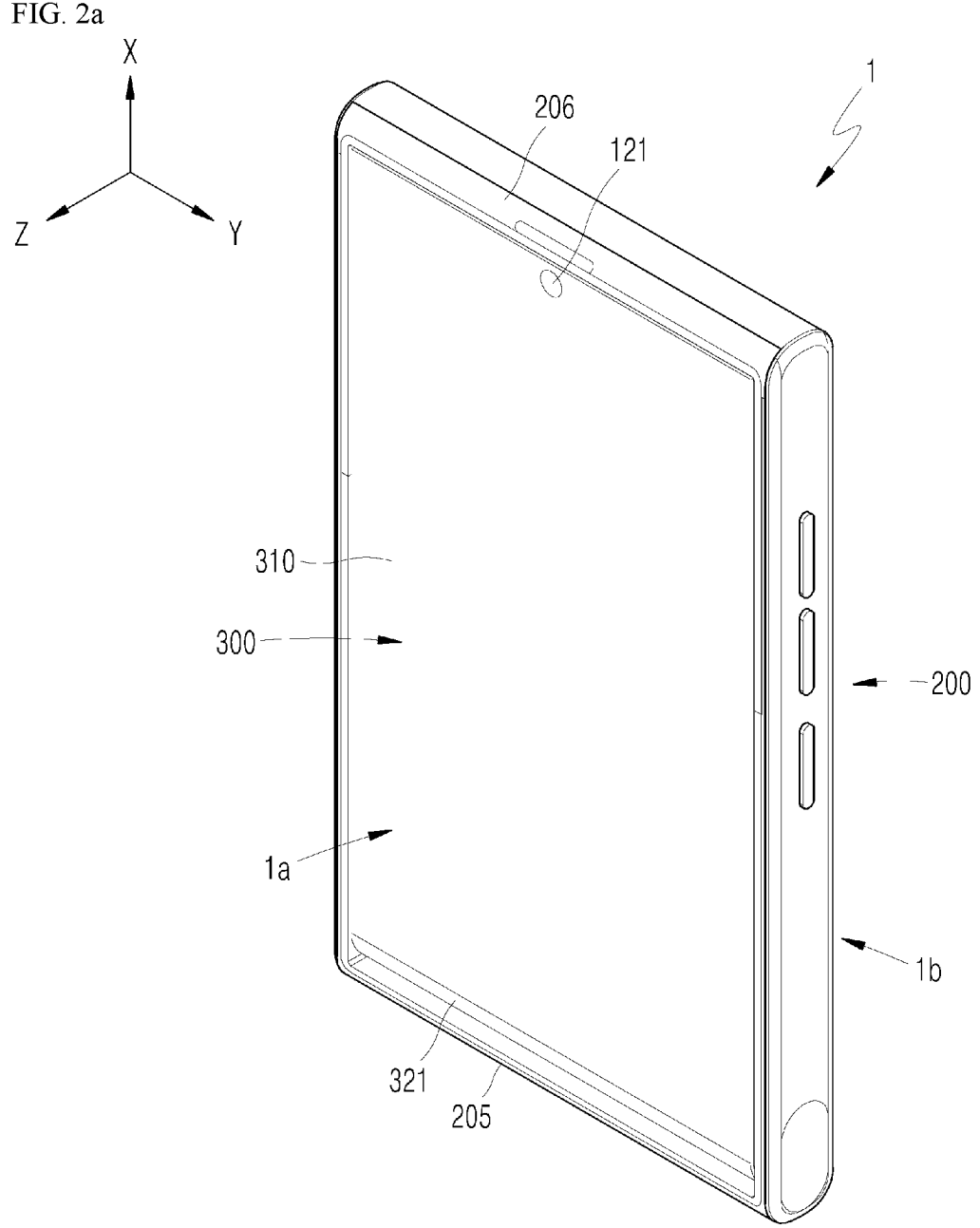
FIG. 2a is a perspective view of the flexible display device in a first state.
Figure 2B:
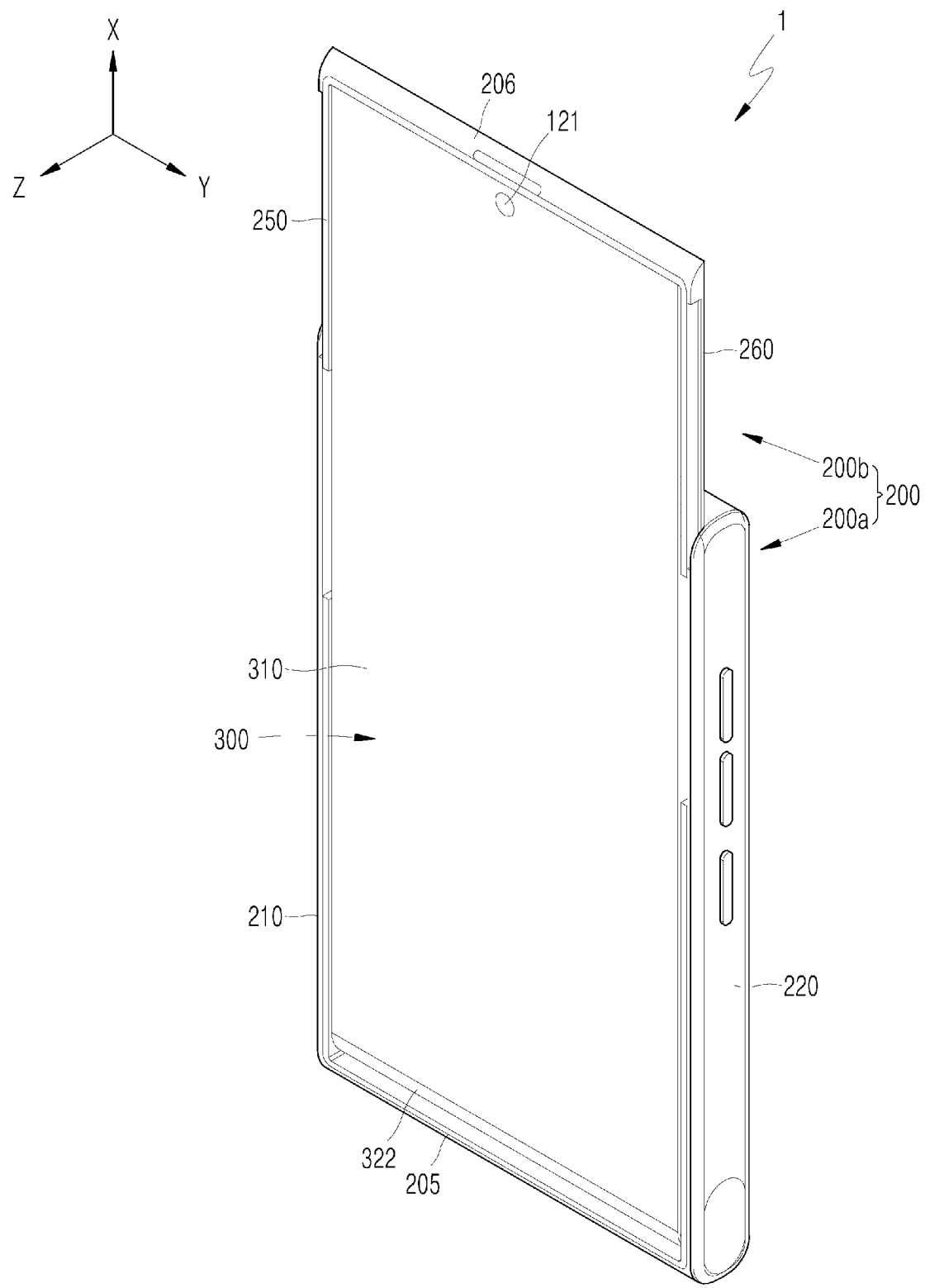
FIG. 2b is a perspective view of the flexible display device of FIG. 2a in a second state in which the flexible display has been deformed.

FIG. 2a is a perspective view of a flexible display device 1 in a first state, and FIG. 2b is a perspective view of the flexible display device 1 of FIG. 2a in a second state in which the flexible display device 1 has been deformed.

The flexible display device 1 may include a body 200. The body 200 may include a first body 200a and a second body 200b.

In describing embodiments of the present disclosure, a first direction (X direction), a second direction (Y direction), and a third direction (Z direction) shown in the drawings are directions perpendicular to one another.

The flexible display device 1 may include two surfaces 1a and 1b which are opposite to each other. In other words, the flexible display device 1 may include a first surface 1a and a second surface 1b. A direction the first surface 1a faces (i.e. a direction perpendicular to or substantially perpendicular to the first surface 1a) may be opposite to a direction the second surface 1b faces (i.e. a direction perpendicular to or substantially perpendicular to the second surface 1b). In the flexible display device 1, the first surface 1a may face the third direction (Z direction), and the second surface 1b may face a direction opposite to the third direction (Z direction). When the first surface 1a is a front surface of the flexible display device 1, the second surface 1b may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material. For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (Z direction), the body 200 may be formed in a quadrangular shape as a whole, and may be flat as a whole.

The body 200 may be divided into two or more parts. As described in detail above, the body 200 may include the first body 200a and the second body 200b, and the first body 200a and the second body 200b may be formed to move relative to each other (see FIGS. 2a and 2b).

The second body 200b may slide and reciprocate relative to the first body 200a. Accordingly, when viewed from the front (Z direction), the total area occupied by the body 200 may change as the second body 200b moves.

The second body 200b may reciprocate relative to the first body 200a between a first position and a second position.

When viewed from the front or rear, the total area occupied by the body 200 (the area of the body 200 projected in the Z direction) may be the smallest when the second body 200b is in the first position (see FIG. 2a), and the total area occupied by the body 200 (the area of the body 200 projected in the Z direction) may be the largest when the second body 200b is in the second position (see FIG. 2b).

When viewed from the front or rear, the overlapping area between the first body 200a and the second body 200b may be the largest when the second body 200b is in the first position (see FIG. 2a), and the overlapping area between the first body 200a and the second body 200b may be the smallest when the second body 200b is in the second position (see FIG. 2b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

Figure 3A:
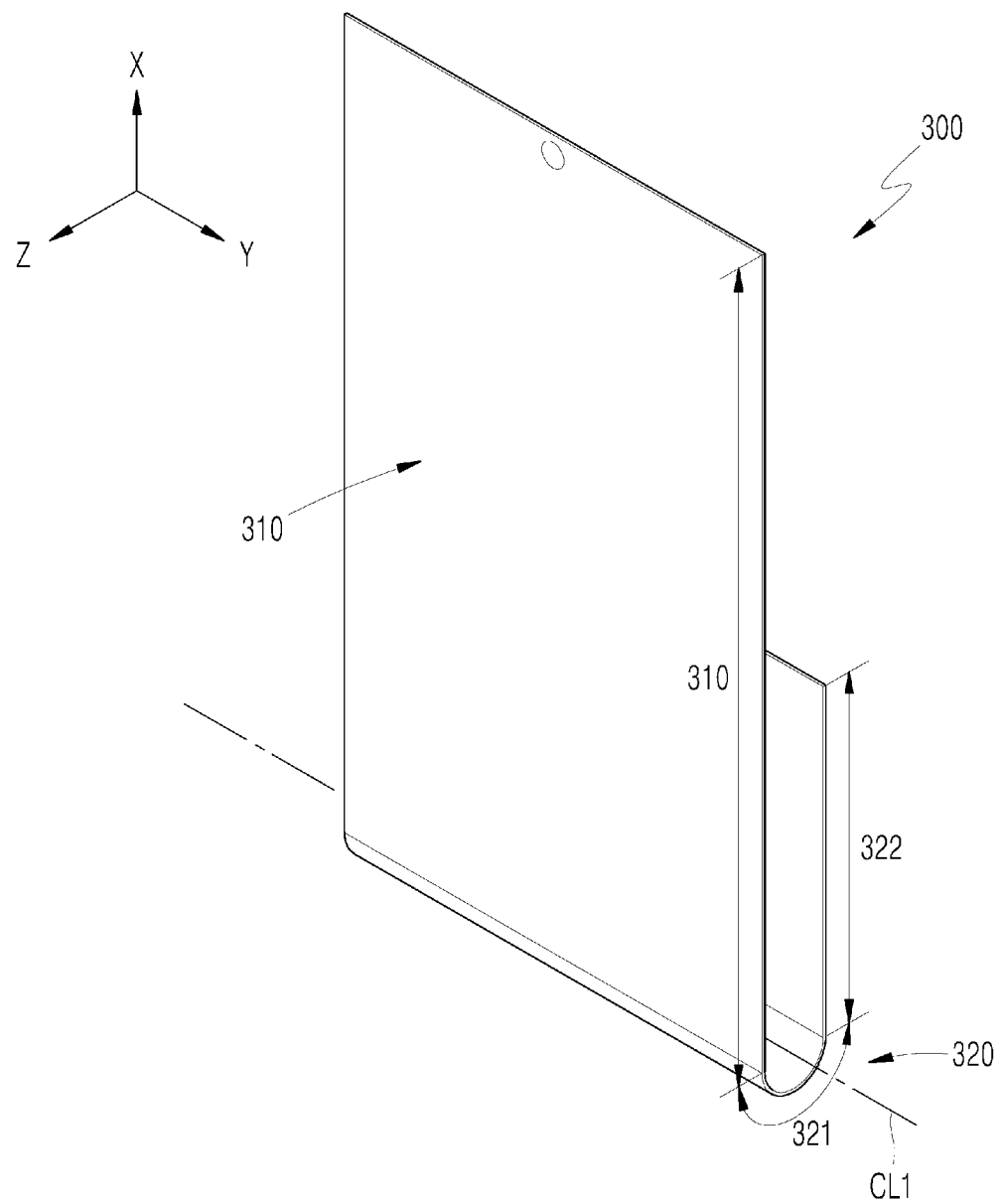
FIG. 3a is a perspective view of a flexible display separated from the flexible display device in the first state.
Figure 3B:
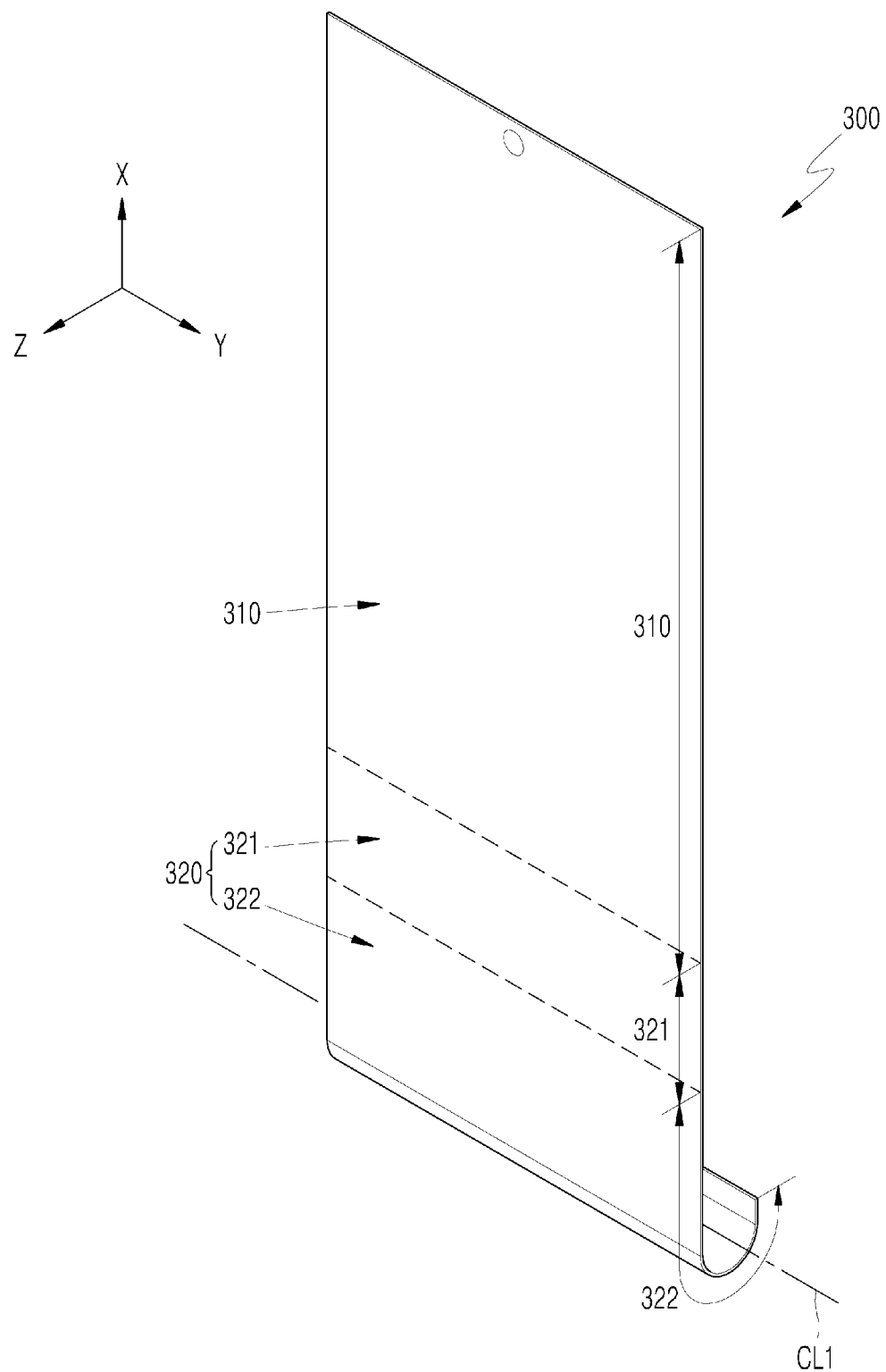
FIG. 3b is a perspective view of the flexible display of FIG. 3a when the flexible display has been deformed (i.e. when the flexible display device is in the second state).

FIG. 3a is a perspective view of a flexible display 300 separated from the flexible display device 1 in a first state, and FIG. 3b is a perspective view of the flexible display 1 of FIG. 3a when the flexible display 300 has been deformed (i.e. when the flexible display device 1 is in a second state).

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

If the flexible display 300 is not coupled to the body 200 and is spread flat, the first region 310 and the second region 320 may form a single plane.

Broken lines shown in FIG. 3b are imaginary lines respectively representing a boundary between the first region 310 and (a first connected region 321 of) the second region 320, and a boundary between the first connected region 321 and a second connected region 322.

The first region 310 may have a predetermined area and may be coupled to the body 200 from any one side of the body 200. The first region 310 may be coupled to the second body 200b, and may be fixed to the second body 200b. That is, the first region 310 may be formed so as not to move relative to the second body 200b.

The first region 310 may be parallel to the first direction (X direction) and second direction (Y direction). The first region 310 may be fixed in front of the second body 200b. The first region 310 may be fixed in front of the second body 200b based on the third direction. The first region 310 and the second body 200b may be coupled to each other so as to be parallel to each other.

In an embodiment of the present disclosure, the first region 310 may form a curved surface as a whole. Here, a curvature of the first region 310 may be smaller than a curvature of the first connected region 321 in the first state, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The second region 320 may extend from the first region 310, and a portion of the second region 320 may be curved around a first support body 400. That is, a direction of formation of the second region 320 may be changed on the first support body 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and a second connected region 322.

The first connected region 321 may be directly connected to the first region 310, and the second connected region 322 may be directly connected to the first connected region 321.

When the second body 200b is in the first position, the first connected region 321 may form a curved surface along the circumferential direction of the first support body 400.

When the second body 200b is in the first position, the first connected region 321 may form an outer surface of the flexible display 300 that is curved about a first axis CL1. When the second body 200b is in the first position, the first axis CL1 may be an imaginary straight line that forms a center of curvature of the first connected region 321, and may be parallel to the second direction.

When the second body 200b is in the first position, a cross section of the first connected region 321 may form a semicircular shape.

The first axis CL1 may coincide with the central axis of the first support body 400.

When the second body 200b is in the second position, the first axis CL1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face the opposite direction to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

Figure 4:
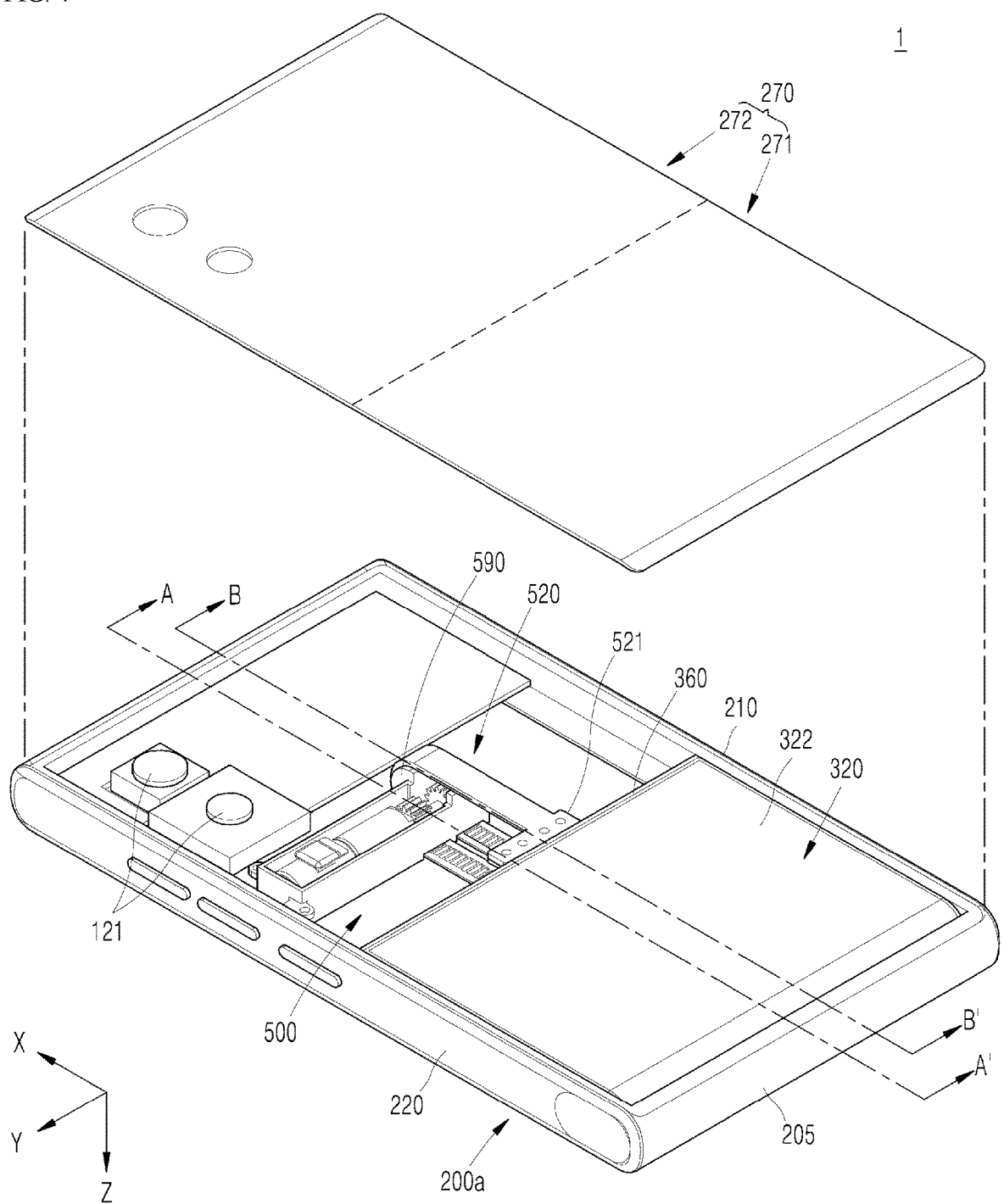
FIG. 4 is an exploded perspective view of the flexible display device in the first state.

FIG. 4 is an exploded perspective view of the flexible display device 1 in the first state.

Figure 5:
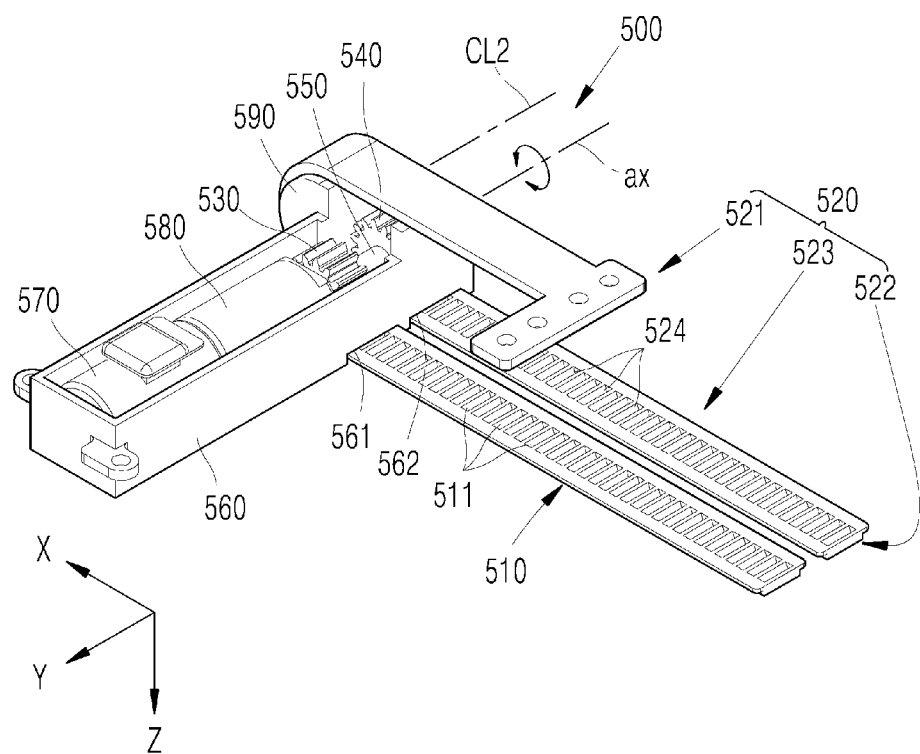
FIG. 5 is a perspective view of a driving device separated from the flexible display device of FIG. 4.

FIG. 5 is a perspective view of a driving device 500 separated from the flexible display device 1 of FIG. 4.

Figure 6:
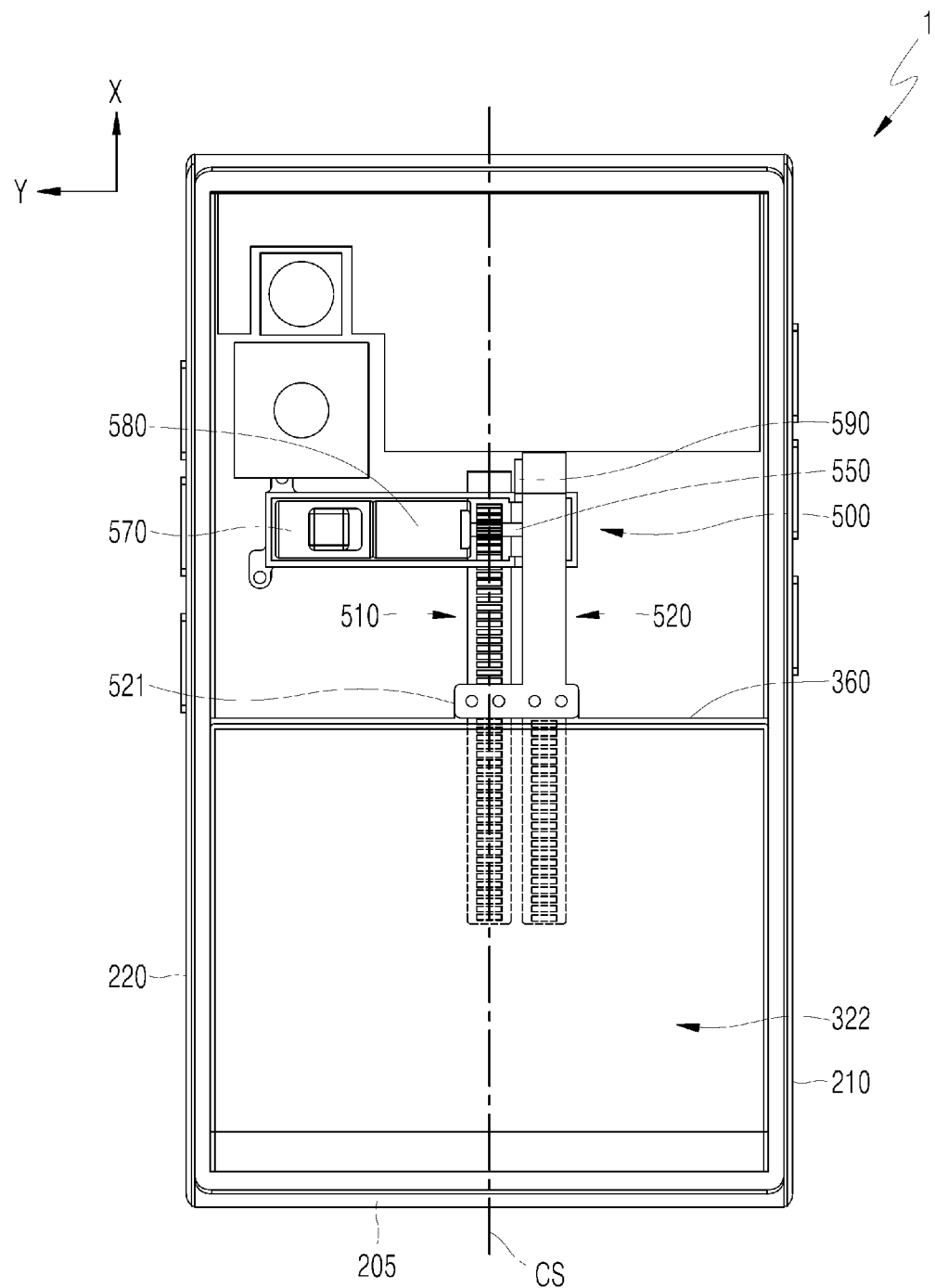
FIG. 6 is a rear view of the flexible display device illustrated in FIG. 4.

FIG. 6 is a rear view of the flexible display device 1 illustrated in FIG. 4.

Figure 7A:
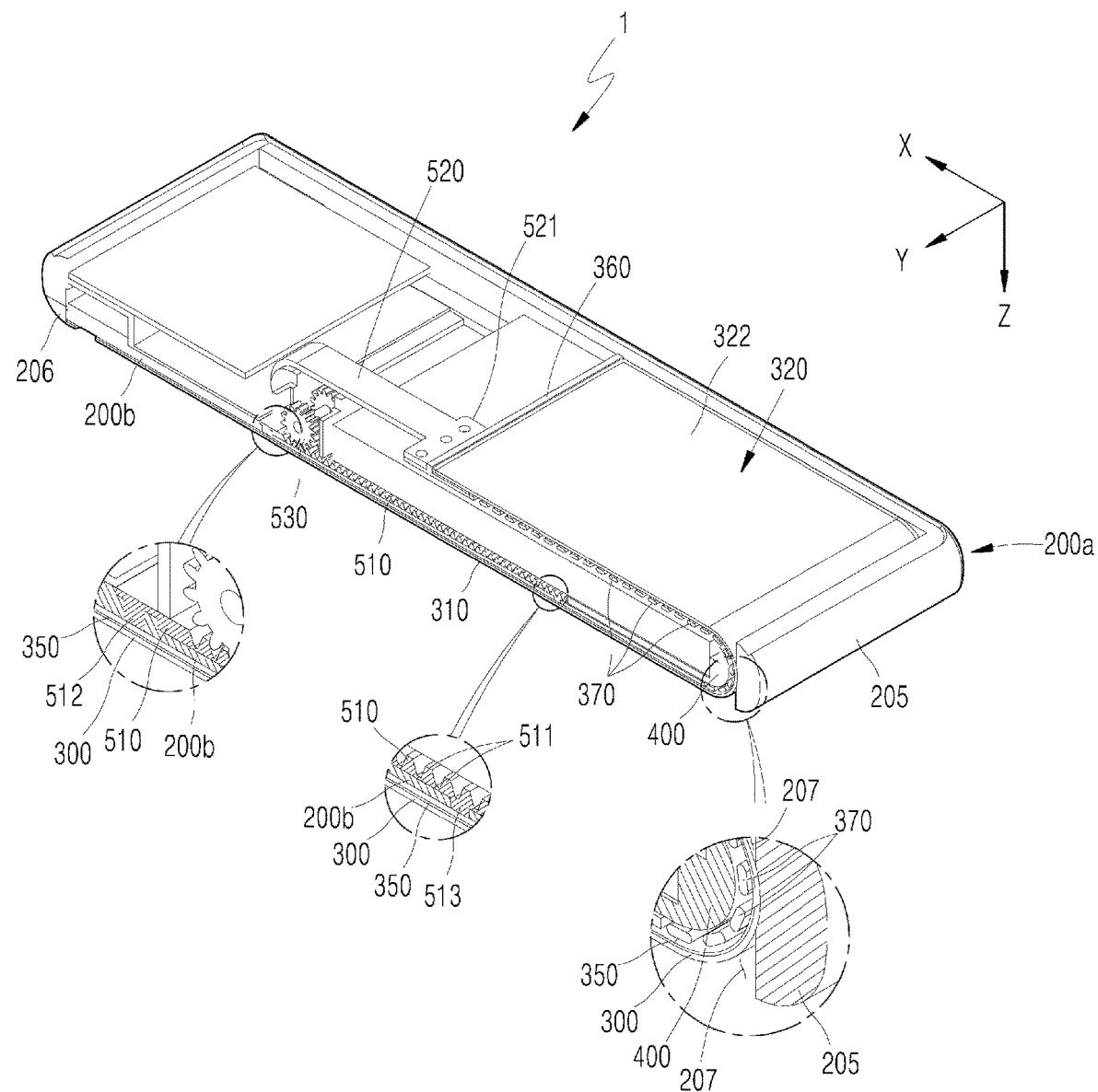
FIG. 7a is a cross-sectional perspective view of the flexible display device taken along the line A-A' in FIG. 4.
Figure 7B:
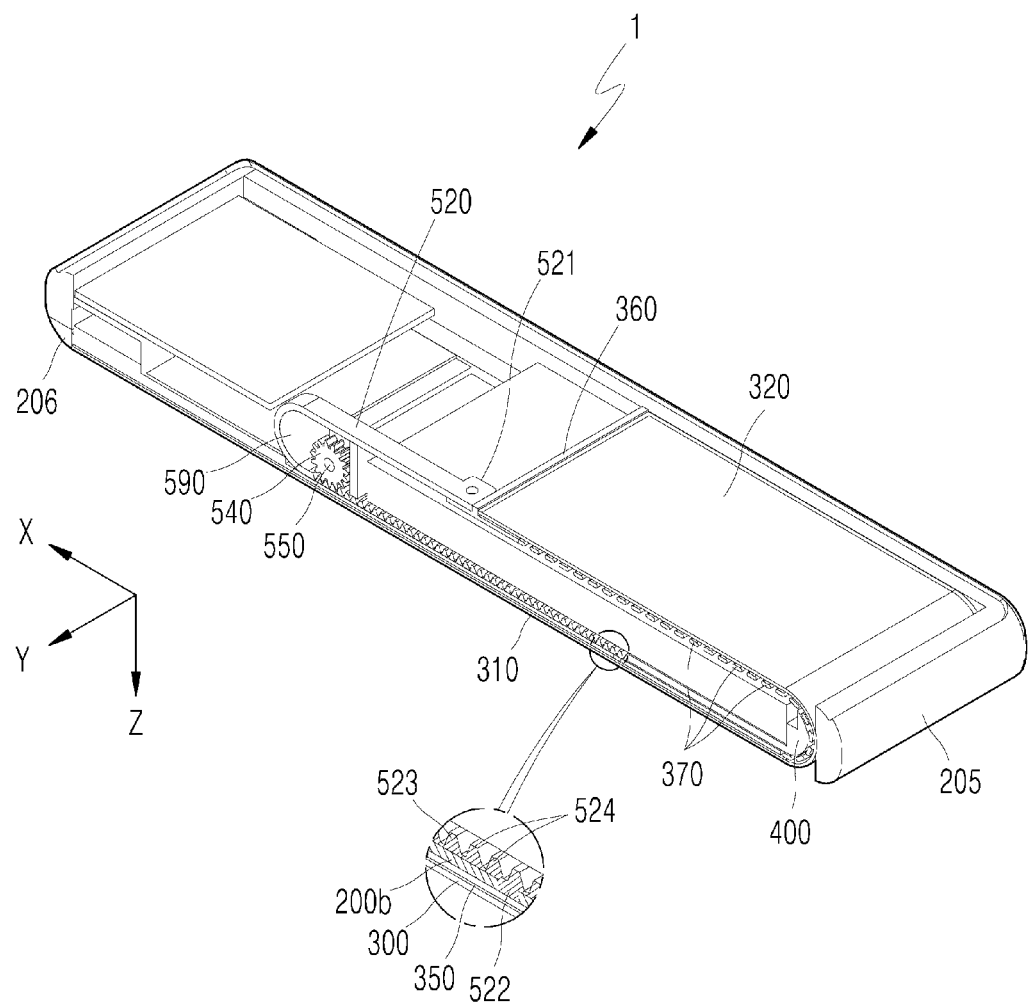
FIG. 7b is a cross-sectional perspective view of the flexible display device taken along the line B-B' in FIG. 4.

FIG. 7a is a cross-sectional perspective view of the flexible display device 1 taken along the line A-A' in FIG. 4, and FIG. 7b is a cross-sectional perspective view of the flexible display device 1 taken along the line B-B' in FIG. 4.

The flexible display device 1 may include a back cover 270.

The back cover 270 may be formed in the shape of a substantially flat plate. The back cover 270 may be formed in the shape of a plate that is substantially parallel to the first direction (X direction) and the second direction (Y direction). The back cover 270 may be parallel to or substantially parallel to the first region 310.

The back cover 270 may form a rear surface of the first body 200a. The back 270 may be fixedly coupled to the first body 200a.

In order to show an inside of the flexible display device 1, FIG. 4 illustrates a state in which the back 270 has been separated from the first body 200a.

The back cover 270 may be formed to be transparent or opaque.

The back cover 270 may be formed such that a surface area thereof corresponds to a surface area of the first region 310. Alternatively, the back cover 270 may be formed such that the surface area thereof is equal to or greater than the surface area of the first region 310.

The back cover 270 may be divided into a first rear surface region 271 and a second rear surface region 272.

When the first rear surface region 271 forms a lower part of the flexible display device 1, the second rear surface region 272 may form an upper part of the flexible display device 1.

The first rear surface region 271 may be formed to be transparent, and the second rear surface region 272 may be formed to be opaque.

When the second body 200b is in the first position, the first rear surface region 271 may be overlapped with the second connected region 322. When the second body 200b is in the first position, a surface area of the first rear surface region 271 may correspond to a surface area of the second connected region 322. Alternatively, the surface area of the first rear surface region 271 may be equal to or greater than the surface area of the second connected region 322.

When the first rear surface region 271 is formed to be transparent, an image displayed on the second connected region 322 while the second body 200b is in the first position may be seen through the first rear surface region 271.

The flexible display device 1 may include a camera 121. The camera 121 may be provided as a plurality of cameras.

Some of the plurality of cameras 121 may be fixed to a front surface of the body 200. Here, the some of the cameras 121 may be fixed to a front surface of the second body 200b.

Others of the plurality of cameras 121 may be fixed to a rear surface of the body 200. Here, the others of the cameras 121 may be coupled to the body 200 so as to face the opposite direction of the third direction (Z direction). The cameras 121 may be fixed to the rear surface of the first body 200a.

The cameras 121 may be fixed to the body 200 at a position relatively far away from a first support body 400. That is, if the first support body 400 is coupled to the body 200 at a position relatively close to a lower side of the flexible display device 1, the cameras 121 may be coupled to the body 200 at a position relatively close to an upper side of the flexible display device 1. The cameras 121 may be fixed to the first body 200a at a position adjacent to an edge of the first body 200a that is farthest from the first support body 400.

The cameras 121 may be provided as two or more cameras 121 and arranged along the first direction (X direction) or the second direction (Y direction).

The first body 200a may include a first edge portion 205.

The first edge portion 205 may form any one edge of the flexible display device 1. The first edge portion 205 may form any one side of the flexible display device 1 having a rectangular shape.

The first edge portion 205 may form a bottom side edge of the first body 200a.

The first edge portion 205 may be fixed to the first body 200a. The first edge portion 205 may be formed integrally with the first body 200*a*, or alternatively, may be formed separately from the first body 200*a* and then fixed thereto.

The first edge portion 205 may be formed to extend substantially along the second direction (Y direction).

At least a portion of the first edge portion 205 may have a constant cross section along the second direction (Y direction). An outer surface of the first edge portion 205 may form a convex curved surface, and a cross section of the first edge portion 205 may have a semicircular shape or the like.

The first edge portion 205 may be disposed at an outer side of the first support body 400.

A gap 207, which is relatively narrow, may be provided between the first edge portion 205 and the first support body 400, and through the gap 207, the flexible display 300 may move, forming a curved surface (see FIGS. 7*a* and 7*b*).

In addition, a connection arm 373 of a support bar 370 may move through the gap 207.

The first body 200*a* may include a first side edge portion 210 and a second side edge portion 220. The first side edge portion 210 and the second side edge portion 220 may form both side edges of the first body 200*a*, and may extend in the first direction (X direction). The first side edge portion 210 may be formed over the entire section of any one side edge of the first body 200*a*, or may be formed over a partial section thereof. The second side edge portion 220 may be formed over the entire section of the other side edge of the first body 200*a*, or may be formed over a partial section thereof.

The first side edge portion 210 and the second side edge portion 220 may be formed to be parallel to the first direction (X direction), and may have constant cross sections along the first direction (X direction). If the first side edge portion 210 forms a left side edge of the first body 200*a*, the second side edge portion 220 may form a right side edge of the first body 200*a*.

The second body 200*b* may include a second edge portion 206.

The second edge portion 206 may form an edge of the flexible display device 1 on the opposite side to the first edge portion 205. If the first edge portion 205 forms a lower side edge of the flexible display device 1, the second edge portion 206 may form an upper side edge of the flexible display device 1.

The second edge portion 206 may be fixed to the second body 200*b*. The second edge portion 206 may be formed integrally with the second body 200*b*, or may be formed separately from the second body 200*b* and then fixed thereto.

The second edge portion 206 may be formed to extend substantially in the second direction (Y direction).

At least a portion of the second edge portion 206 may have a constant cross section along the second direction (Y direction).

The second body 200*b* may include a third side edge portion 250 and a fourth side edge portion 260. The third side edge portion 250 and the fourth side edge portion 260 may form both side edges of the second body 200*b*, and may be formed to extend in the first direction (X direction). The third side edge portion 250 and the fourth side edge portion 260 may be formed to be parallel to the first direction (X direction), and may have constant cross sections in the first direction (X direction).

If the third side edge portion 250 forms a left side edge of the second body 200*b*, the fourth side edge portion 260 may form a right side edge of the second body 200*b*.

The third side edge portion 250 may be disposed to align with the first side edge portion 210, and may be disposed so as to come into close contact with the first side edge portion 210 or to be close thereto.

The third side edge portion 250 may be disposed outside the first side edge portion 210 or inside the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed outside the second side edge portion 220 or inside the second side edge portion 220.

The flexible display device 1 may include a first rack 510, a second rack 520, a first gear 530, and a second gear 540.

The flexible display device 1 may include a driving device 500.

The first rack 510, the second rack 520, the first gear 530, and the second gear 540 may be components of the driving device 500.

The flexible display device 1 may include a driving motor 570, a driving bracket 560, and a driving shaft 550. The flexible display device 1 may include a gear reducer 580. The driving motor 570, the driving bracket 560, the driving shaft 550, and the gear reducer 580 may be components of the driving device 500.

The flexible display device 1 may include a second support body 590.

The second support body 590 may have a constant outer surface along the second direction (Y direction).

At least a portion of the outer surface of the second support body 590 may form a curved surface. The portion of the outer surface of the second support body 590 that forms a curved surface may support a curved portion of the second rack 520. The portion of the outer surface of the second support body 590 that forms a curved surface may have a semicircular-shaped cross section.

In one embodiment, the second support body 590 may be formed integrally with the first body 200*a*. In another embodiment, the second support body 590 may be formed integrally with the driving bracket 560. When the second support body 590 is formed integrally with the driving bracket 560, the second support body 590 may be a component of the driving device 500.

In yet another embodiment, the second support body 590 may be formed in the shape of a roller that can rotate about a rotation axis extending along the second direction (Y direction). That is, the second support body 590 may be rotatably coupled to the first body 200*a* or the driving bracket 560.

Teeth 511 may be repeatedly formed on the first rack 510 along a direction parallel to the first direction (X direction).

The teeth 511 of the first rack 510 may be formed along a longitudinal direction of the first rack 510, and may be formed in the entire section of the first rack 510 or in a partial section of the first rack 510.

The teeth 511 of the first rack 510 may be formed on a surface of the first rack 510 opposite to a surface of the first rack 510 to which the second body 200*b* is coupled. If the second body 200*b* is coupled to an outer surface of the first rack 510, the teeth 511 of the first rack 510 may be formed on an inner surface of the first rack 510.

The first rack 510 may be coupled to the second body 200*b*. The first rack 510 may be fixed to the second body 200*b*, and may move together with the second body 200*b* with respect to the first body 200*a*.

In one embodiment, the first rack 510 may include a first protruding portion 512 and a second protruding portion 513, which protrude in the third direction (Z direction). The first protruding portion 512 and the second protruding portion 513 may be spaced apart from each other along the first direction (X direction).

The first protruding portion 512 and the second protruding portion 513, respectively, may be inserted into an inside of the second body 200b, to be fixed to the second body 200b.

The first rack 510 may be formed along a center line (CS) that bisects the flexible display device 1 along the first direction (X direction). Accordingly, when the second body 200b moves with respect to the first body 200a, left-right balance may be maintained.

If the first rack 510 is configured not to be changed in shape when the flexible display device 1 according to the present embodiment of the present disclosure is deformed between the first state and the second state, the second rack 520 may be configured to be changed in shape.

The second rack 520 may be formed in the shape of a rack, and may be made of such a material that the second rack 520 can be flexibly bent. The second rack 520 may be made of metal, plastic, or a combination thereof, or may be formed to include the same. The second rack 520 may include engineering plastic. The second rack 520 may include metal, plastic, rubber, fiber, or a combination thereof.

Teeth 524 may be repeatedly formed on the second rack 520 along a direction orthogonal to the second direction (Y direction). The second rack 520 may be curved about a second axis CL2, which is parallel to a first axis CL1, forming a curved surface.

The second axis CL2 may form a central axis of the second support body 590. The outer surface of the second support body 590 may form a curved surface about the second axis CL2.

The second rack 520 may be form a continuous loop together with at least the second region 320. A combination of the second region 320 and the second rack 520 may form a continuous loop.

In one embodiment, a mere combination of the second region 320 and the second rack 520 may form a continuous loop, and in another embodiment, a combination of the second region 320, the second rack 520, and another element(s) may form a continuous loop.

The second rack 520 according to the embodiment of the present disclosure may include a first coupling portion 521, a second coupling portion 522, and a flexible portion 523.

The first coupling portion 521 and the second coupling portion 522 may respectively form both end portions of the second rack 520, and the flexible portion 523 may form a middle portion of the second rack 520 and connect the first coupling portion 521 and the second coupling portion 522 to each other.

The first coupling portion 521 may be coupled to any one side of the flexible display 300, and the second coupling portion 522 may be coupled to the opposite one side of the flexible display 300, such that the continuous loop is formed.

The first coupling portion 521 may be fixedly coupled to the flexible display 300 at a position adjacent to an end portion of the flexible display 300 (i.e., an end portion at a side of the second region 320). The first coupling portion 521 may be coupled to the flexible display 300 at a position adjacent to an edge of the second connected region 322.

In one embodiment, the first coupling portion 521 may be directly coupled to the second connected region 322.

In another embodiment, the first coupling portion 521 may be coupled to the second connected region 322 by medium of an element. Here, the first coupling portion 521 may be connected (or coupled) to the second connected region 322 by medium of a connection frame 360.

As the connection frame 360 is fixed to the edge of the second connected region 322, and the first coupling portion 521 is fixed to the connection frame 360, the first coupling portion 521 and the second connected region 322 may be coupled to each other.

The second coupling portion 522 may be fixedly connected to the flexible display 300 at a position adjacent to a middle portion of the flexible display 300 (i.e., a boundary portion between the first region and the second region). The second coupling portion 522 may be directly connected to the flexible display 300, or alternatively, may be connected to the flexible display 300 by medium of an element.

In one embodiment, the second coupling portion 522 may be fixedly coupled to the second body 200b, and may be connected (or coupled) to the flexible display 300 by medium of the second body 200b.

In one embodiment, the second coupling portion 522 may be formed in the shape of a protrusion protruding in the third direction (Z direction), so as to be inserted into the inside of the second body 200b and coupled to the second body 200b.

The teeth 524 of the second rack 520 may be formed on the flexible portion 523.

The teeth 524 of the second rack 520 may be formed along a longitudinal direction of the flexible portion 523, and may be formed in the entire section of the flexible portion 523 or in a partial section of the flexible portion 523.

The teeth 524 of the second rack 520 may be formed on an inner surface of the second rack 520.

A portion of the second rack 520, in particular of the flexible portion 523, that engages with the second gear 540 may be parallel to the first rack 510.

The first coupling portion 521 may extend from the flexible portion 523 to any one side or both sides along a direction or directions parallel to the second direction (Y direction). As the first coupling portion 521 extends from the flexible portion 523 in the direction parallel to the second direction (Y direction), even when a width of the flexible portion 523 is relatively narrow, a width of a coupling portion between the first coupling portion and the flexible display 300 may be relatively wide, and thus, tension applied to the second rack 520 may be stably transferred to the flexible display 300.

The flexible portion 523 may be positioned at a left side or right side of the center line (CS). Here, the first coupling portion 521 may extend from the flexible portion 523 to beyond the center line (CS). Accordingly, when tension applied to the second rack 520 is transferred to the flexible display 300, left-right balance of the flexible display 300 may be maintained.

The first gear 530 may be configured to engage with the teeth 511 of the first rack 510. The first gear 530 may be rotatably coupled to the first body 200a or the driving bracket 560. The first gear 530 may be coupled to the driving shaft 550 and rotate together with the driving shaft 550.

The second gear 540 may be configured to engage with the teeth 524 of the second rack 520. The second gear 540 may be rotatably coupled to the first body 200a or the driving bracket 560. The second gear 540 may be coupled to the driving shaft 550 and rotate together with the driving shaft 550.

The first gear 530 and the second gear 540 may rotate in the same direction as each other.

The first gear 530 and the second gear 540 may rotate in conjunction with each other. The first gear 530 and the second gear 540 may be coupled to each other through the driving shaft 550 and rotate in the same direction as each other.

Each of the first gear 530 and the second gear 540 may be formed as a pinion gear.

The first gear 530 may be configured to transfer rotation force of the driving motor 570 to the first rack 510. The first gear 530 may be configured such that when the driving motor 570 is operated, the first rack 510 linearly reciprocates along the first direction (X direction).

The second gear 540 may be configured to transfer the rotation force of the driving motor 570 to the second rack 520. The second gear 540 may be configured such that when the driving motor 570 is operated, part of the second rack 520 (that is, part of the flexible portion 523) linearly reciprocates along the first direction (X direction).

The driving bracket 560 may be configured to receive the first rack 510, the second rack 520, and the driving motor 570. The driving bracket 560 may be fixed to the first body 200a.

The driving bracket 560 may include a first guide groove 561 and a second guide groove 562.

The first guide groove 561 may be formed in the form of a concave groove at one side of the driving bracket 560. The first guide groove 561 may support both side edges of the first rack 510 such that the first rack 510 slides through the first guide groove 561.

The second guide groove 562 may be formed in the form of a concave groove at one side of the driving bracket 560. The second guide groove 562 may be formed beside the first guide groove 561 to be adjacent thereto. The second guide groove 562 may support both side edges of the second rack 520 (that is, the flexible portion 523) such that the second rack 520 (that is, the flexible portion 523) slides through the second guide groove 562.

The driving motor 570 may be configured to rotate the first gear 530 and the second gear 540. The driving motor 570 may be received in the driving bracket 560 and fixed to the driving bracket 560.

The driving motor 570 may be configured as a general motor which is rotated by electric power, and may be configured as a step motor. The driving motor 570 may be coupled directly to the first gear 530 and the second gear 540 to rotate the first gear 530 and the second gear 540. Alternatively, the driving motor 570 may use another gear as a medium to rotate the first gear 530 and the second gear 540.

The driving shaft 550 may be formed to be parallel to the second direction (Y direction) and may be configured to be rotated by the driving motor 570. The driving shaft 550 may be coaxially coupled to the first gear 530 and the second gear 540. The first gear 530 and the second gear 540 may be fixed to the driving shaft 550, and when the driving shaft 550 is rotated by the driving motor 570, the first gear 530 and the second gear 540 may rotate together with the driving shaft 550.

The gear reducer 580 may be received in the driving bracket 560 and configured to transfer driving force of the driving motor 570 to the driving shaft 550.

The gear reducer 580 may be coupled to the driving motor 570 and the driving shaft 550.

The gear reducer 580 may transfer the rotation force of the driving motor 570 to the driving shaft 550, and may include therein a plurality of gears rotating in conjunction with the driving motor 570 and the driving shaft 550. That is, the rotation force of the driving motor 570 may be transferred sequentially to a rotation shaft of the driving motor 570, to the gears within the gear reducer 580, and then to the driving shaft 550. In the flexible display device 1 according to the embodiment of the present disclosure, speed may be changed by the gear reducer 580, and the number of rotations per unit time of the driving motor 570 may be different from the number of rotations per unit time of the driving shaft 550.

In the embodiment of the present disclosure, the gears within the gear reducer 580 may consist of reduction gears. The driving shaft 550 may rotate in conjunction with the driving motor 570, and the number of rotations per unit time of the driving shaft 550 may be smaller than the number of rotations per unit time of the driving motor 570.

In the flexible display device 1 according to the embodiment of the present disclosure, the driving motor 570 may operate such that the state of the flexible display device 1 is shifted from the first state to the second state.

When the driving motor 570 operates for the shift from the first state to the second state of the flexible display device 1, the first gear 530 may be rotated by an operation of the driving motor 570, and the first rack 510 engaging with the first gear 530 may move in the first direction (X direction).

In addition, the second gear 540 may be rotated in the same direction as that of the first gear 530 by the operation of the driving motor 570, and a portion of the second rack 520 that engages with the second gear 540 may move in the first direction (X direction). The second coupling portion 522 may move in the first direction (X direction), the first coupling portion 521 may move in the opposite direction of the first direction (X direction), and the second rack 520 may move and turn. Here, a curved portion of the flexible portion 523 may change.

As the second body 200b moves from the first position to the second position, a surface area of a portion of the second region 320 that forms a single plane surface with the first region 310 may gradually increase, and at this time, since the end portion of the second region 320 (i.e., an end portion of the second connected region 322) is fixed to the first coupling portion 521 by the connection frame 360, a state in which the second rack 520 pulls the flexible display 300 may be maintained. Accordingly, a predetermined tension may be applied over the entire section of the flexible display 300, and thus the flexible display 300 may be stably maintained.

In the flexible display device 1 according to the embodiment of the present disclosure, the driving motor 570 may operate such that the state of the flexible display device 1 is shifted from the second state to the first state.

Here, when the driving motor 570 operates for the shift from the second state to the first state, the first gear 530 may be rotated by an operation of the driving motor 570, and the first rack 510 engaging with the first gear 530 may move in the opposite direction of the first direction (X direction).

In addition, the second gear 540 may be rotated in the same direction as that of the first gear 530 by the operation of the driving motor 570, and a portion of the second rack 520 that engages with the second gear 540 may move in the opposite direction of the first direction (X direction). As a result, the second coupling portion 522 may move in the opposite direction of the first direction (X direction), the first coupling portion 521 may move in the first direction (X direction), and the second rack 520 may move and turn. Here, a curved portion of the flexible portion 523 may change.

As the second body 200b moves from the second position to the first position, the surface area of the portion of the second region 320 that forms a single plane surface with the first region 310 may gradually decrease, and at this time, since the end portion of the second region 320 (i.e., the end portion of the second connected region 322) is fixed to the first coupling portion 521 by the connection frame 360, a state in which the second rack 520 pulls the flexible display 300 may be maintained. Accordingly, a predetermined tension may be applied over the entire section of the flexible display 300, and thus the flexible display 300 may be stably maintained.

When the second body 200b moves between the first position and the second position with respect to the first body 200a, the amount of movement of each portion of the flexible display 300 may be maintained to be constant by a distance between two adjacent teeth 511 of the first rack 510 (i.e., a distance between a center of one tooth 511 and a center of a next tooth 511, or a pitch), a distance between two adjacent teeth 524 of the second rack 520 (i.e., a distance between a center of one tooth 524 and a center of a next tooth 524, or a pitch), the number of teeth of the first gear 530, and the number of teeth of the second gear 540. Accordingly, the form of the flexible display 300 may be stably maintained at the entire deformed section of the flexible display device 1.

Figure 8A:
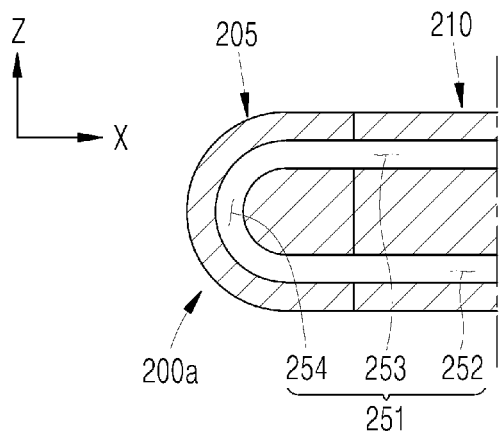
FIG. 8a is a cross-sectional view illustrating inner surfaces of a first side edge portion and a first edge portion.
Figure 8B:
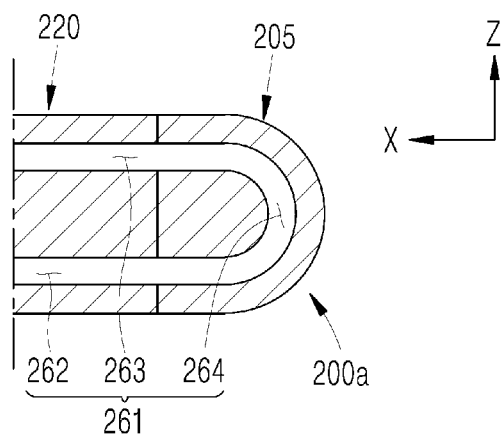
FIG. 8b is a cross-sectional view illustrating inner surfaces of a second side edge portion and a second edge portion.

FIG. 8a is a cross-sectional view illustrating inner surfaces of a first side edge portion 210 and a first edge portion 205, and FIG. 8b is a cross-sectional view illustrating inner surfaces of a second side edge portion 220 and the first edge portion 205.

Figure 9:
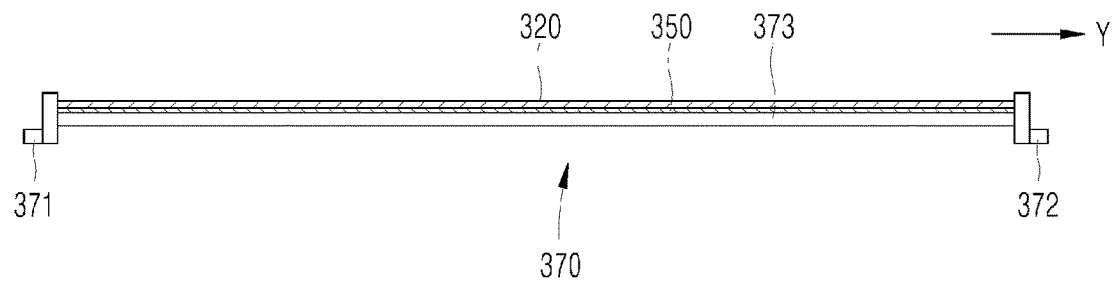
FIG. 9 is a cross-sectional view schematically illustrating a state in which an inner plate and the flexible display are coupled.

FIG. 9 is a cross-sectional view schematically illustrating a state in which the support bar 370, the inner plate 350, and the flexible display 300 are coupled.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm.

According to an embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a connection frame 360.

The connection frame 360 may generally be formed in a shape of a flat plate extending along the second direction. The connection frame 360 may be made of metal, plastic, and the like.

The connection frame 360 may be fixed to an end portion of the flexible display 300. The connection frame 360 may be fixed to the second region 320.

The connection frame 360 may be fixedly coupled to the second region 320 along an edge thereof that is parallel to the second direction (Y direction), and may serve as a medium to connect the flexible display 300 to the second rack 520.

The connection frame 360 may be coupled to the first body 200a such that the connection frame 360 moves relative to the first body 200a along the first direction.

The connection frame 360 may be slidably coupled to the first body 200a, and for this, both end portions of the connection frame 360 may respectively be inserted into a first rear guide groove 252 and a second rear guide groove 262 and move therein.

The first body 200a may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the first side edge portion 210, and the second rear guide groove 262 and the second front guide groove 263 may be formed in the second side edge portion 220.

In one embodiment of the present disclosure, the first connection guide groove 254 may be formed in the first side edge portion 210, and the second connection guide groove 264 may be formed in the second side edge portion 220. In another embodiment of the present disclosure, the first connection guide groove 254 and the second connection guide groove 264 may be formed in the first edge portion 205.

The first rear guide groove 252 may form a space inside the first side edge portion 210, may have a constant cross section along the first direction, and may be formed to be open inwards from a rear side of the first side edge portion 210.

The first front guide groove 253 may form a space inside the first side edge portion 210, may have a constant cross section along the first direction, and may be formed to be open inwards from a front side of the first side edge portion 210. The first front guide groove 253 may be symmetric with respect to the first rear guide groove 252.

The first connection guide groove 254 may form a semicircular-shaped space inside the first edge portion 205 of the first body 200a and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail.

The second rear guide groove 262 may form a space inside the second side edge portion 220, may have a constant cross section along the first direction, and may be formed to be open inwards from a rear side the second side edge portion 220.

The second front guide groove 263 may form a space inside the second side edge portion 220, may have a constant cross section along the first direction, and may be formed to be open inwards from a front side of the second side edge portion 220. The second front guide groove 263 may be symmetric with respect to the second rear guide groove 262.

The second connection guide groove 264 may form a semicircular-shaped space inside the first edge portion 205 of the first body 200a and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the support bars 370 at the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the support bars 370, are maintained stable like the first region 310.

The second region 320 may be maintained in a stable state by means of the support bars 370. In particular, when the second region 320 is formed as a touch screen to receive a touch input, the second region 320 may be stably supported by the support bars 370.

Figure 10A:
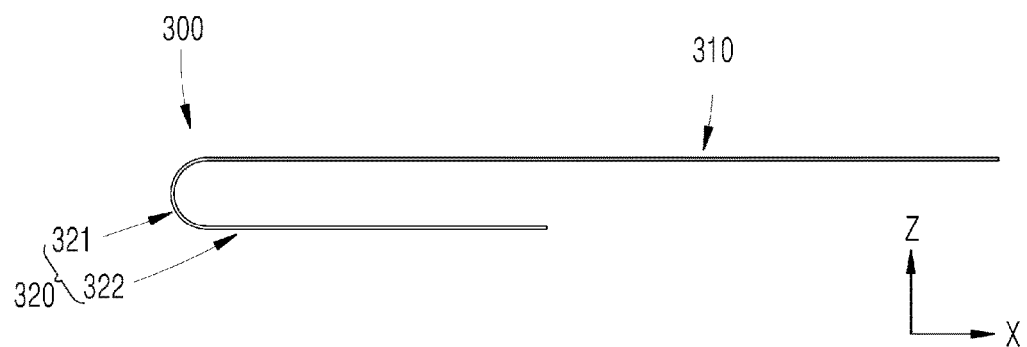
FIG. 10a is a cross-sectional view of the flexible display separated from the flexible display device in the first state.
Figure 10B:
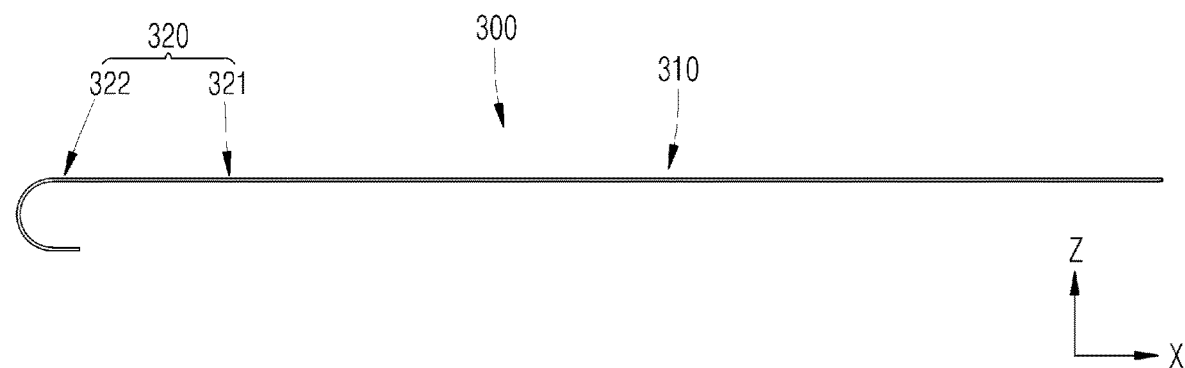
FIG. 10b is a cross-sectional view of the flexible display separated from the flexible display device in the second state.

FIG. 10a is a cross-sectional view of the flexible display 300 separated from the flexible display device 1 in the first state, and FIG. 10b is a cross-sectional view of the flexible display 300 separated from the flexible display device 1 in the second state.

Figure 11A:
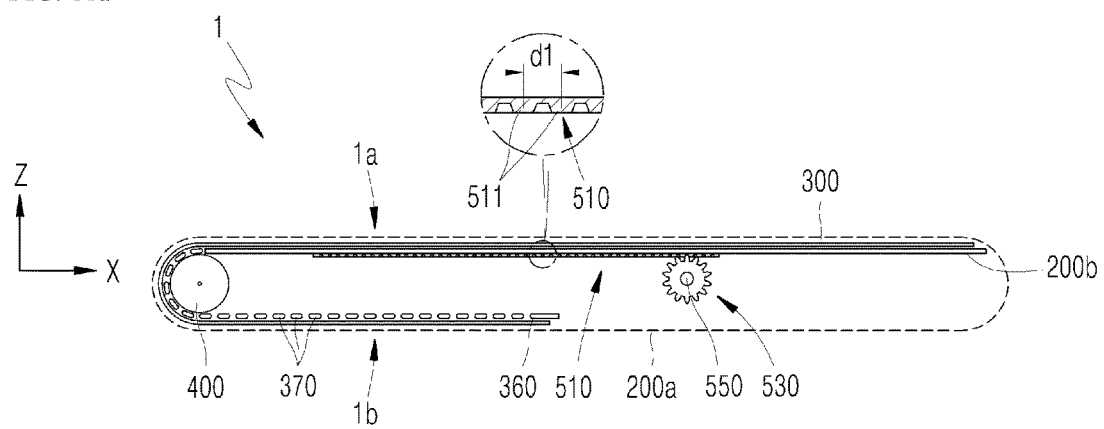
FIG. 11a is a cross-sectional view of the flexible display device schematically illustrating a first rack and a first gear engaging with each other when the flexible display device is in the first state.

FIG. 11a is a cross-sectional view of the flexible display device 1 schematically illustrating the first rack 510 and the first gear 530 engaging with each other when the flexible display device 1 is in the first state.

Figure 11B:
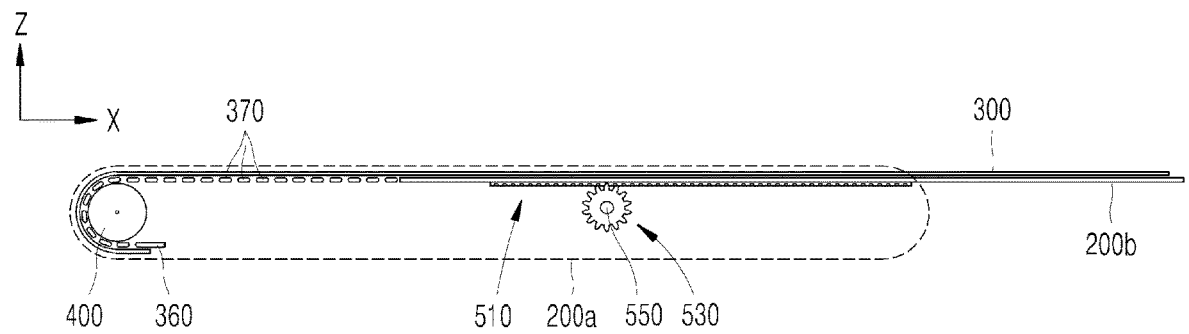
FIG. 11b is a cross-sectional view of the flexible display device schematically illustrating the first rack and the first gear engaging with each other when the flexible display device is in the second state.

FIG. 11b is a cross-sectional view of the flexible display device 1 schematically illustrating the first rack 510 and the first gear 530 engaging with each other when the flexible display device 1 is in the second state.

FIGS. 11a and 11b illustrate the first body 200a with broken lines.

Figure 12A:
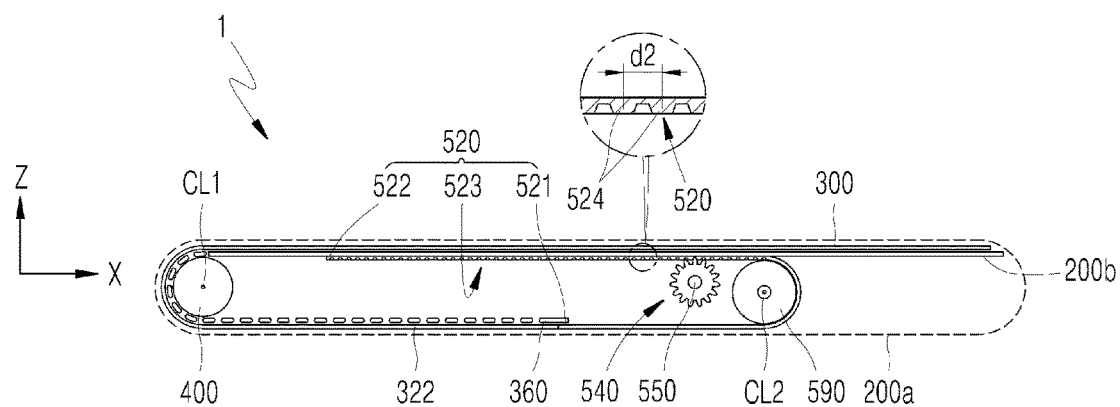
FIG. 12a is a cross-sectional view of the flexible display device schematically illustrating a second rack and a second gear engaging with each other when the flexible display device is in the first state.

FIG. 12a is a cross-sectional view of the flexible display device 1 schematically illustrating the second rack 520 and the second gear 540 engaging with each other when the flexible display device 1 is in the first state.

Figure 12B:
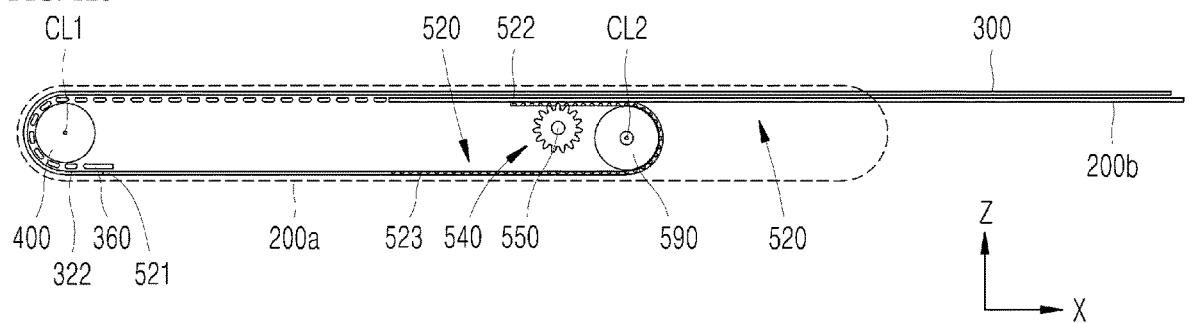
FIG. 12b is a cross-sectional view of the flexible display device schematically illustrating the second rack and the second gear engaging with each other when the flexible display device is in the second state.

FIG. 12b is a cross-sectional view of the flexible display device 1 schematically illustrating the second rack 520 and the second gear 540 engaging with each other when the flexible display device 1 is in the second state.

FIGS. 12a and 12b illustrate the first body 200a with broken lines.

In the flexible display device 1 according to the embodiment of the present disclosure, when the distance (or pitch) between two adjacent teeth 511 of the first rack 510 is d1, the distance (or pitch) between two adjacent teeth 524 of the second rack 520 is d2, the total number of the teeth of the first gear 530 is n1, and the total number of the teeth of the second gear 540 is n2, a movement distance of the first rack 510 per rotation of the first gear 530 in the first direction (X direction) or in the opposite direction of the first direction (X direction) (hereinafter referred to as a "first movement distance L1") may be "n1×d1," and a movement distance of the second rack 520 per rotation of the second gear 540 in the first direction (X direction) or in the opposite direction of the first direction (X direction) (hereinafter referred to as a "second movement distance L2") may be "n2×d2."

In the flexible display device 1 according to the embodiment of the present disclosure, a rotation rate of the first gear 530 and a rotation rate of the second gear 540 may be the same as each other. In addition, the first movement distance L1 and the second movement distance L2 may be the same as each other.

Accordingly, a movement rate of the first rack 510 in the first direction (X direction) or in the opposite direction of the first direction (X direction) may be the same as a movement rate of the second rack 520 in the first direction (X direction) or in the opposite direction of the first direction (X direction).

With regard to this, the operation of the flexible display device 1 according to the embodiment of the present disclosure will now be described below.

In the flexible display device 1 according to the embodiment of the present disclosure, the driving motor 570 may operate such that the state of the flexible display device 1 is shifted from the first state to the second state. Referring to FIG. 11a, the first gear 530 may be rotated clockwise by an operation of the driving motor 570, and the first rack 510 engaging with the first gear 530 may be moved in the first direction (X direction).

In addition, referring to FIG. 12a, the second gear 540 may be rotated clockwise by the operation of the driving motor 570, and a portion of the second rack 520 that engages with the second gear 540 may be moved in the first direction (X direction). The second coupling portion 522 may move in the first direction (X direction), the first coupling portion 521 may move in the opposite direction of the first direction (X direction), and the second rack 520 may move and turn clockwise.

When the second body 200b moves from the first position to the second position, the surface area of the portion of the second region 320 that forms a single plane surface with the first region 310 may gradually increase, and at this time, the movement rate of the first rack 510 and the movement rate of the second rack 520 may be the same as each other. Therefore, the amount of movement of each portion of the flexible display 300 may be maintained to be constant over the entire section of the flexible display 300. That is, the amount of movement of a portion of the first region 310 that moves in the first direction (X direction) and the amount of movement of a portion of the second connected region 322 that moves in the opposite direction of the first direction (X direction) may be the same as each other.

Accordingly, when a surface area of a portion of the flexible display 300 that forms a single plane surface increases, the amount of movement of the flexible display 300 may be constant over the entire section of the flexible display 300, and thus a constant tension may be maintained over the entire section of the flexible display 300.

In the flexible display device 1 according to the embodiment of the present disclosure, the driving motor 570 may operate such that the state of the flexible display device 1 is shifted from the second state to the first state. Referring to FIG. 11b, the first gear 530 may be rotated counterclockwise by an operation of the driving motor 570, and the first rack 510 engaging with the first gear 530 may be moved in the opposite direction of the first direction (X direction).

In addition, referring to FIG. 12b, the second gear 540 may be rotated counterclockwise by the operation of the driving motor 570, and the portion of the second rack 520 that engages with the second gear 540 may be moved in the opposite direction of the first direction (X direction). As a result, the second coupling portion 522 may move in the opposite direction of the first direction (X direction), the first coupling portion 521 may move in the first direction (X direction), and the second rack 520 may move and turn counterclockwise.

When the second body 200b moves from the second position to the first position, the surface area of the portion of the second region 320 that forms a single plane surface with the first region 310 may gradually decrease, and at this time, the movement rate of the first rack 510 and the movement rate of the second rack 520 may be the same as each other. Therefore, the amount of movement of each portion of the flexible display 300 may be maintained to be constant over the entire section of the flexible display 300. That is, the amount of movement of a portion of the first region 310 that moves in the opposite direction of the first direction (X direction) and the amount of movement of a portion of the second connected region 322 that moves in the first direction (X direction) may be the same as each other.

Accordingly, when the surface area of the portion of the flexible display 300 that forms a single plane surface decreases, the amount of movement of the flexible display 300 may be constant over the entire section of the flexible display 300, and thus a constant tension may be maintained over the entire section of the flexible display 300.

In the flexible display device 1 according to the embodiment of the present disclosure, the rotation rate of the first gear 530 and the rotation rate of the second gear 540 may be the same as each other.

In addition, the second movement distance L2 may be smaller than the first movement distance L1. Here, the total number of the teeth of the first gear 530 (i.e., n1) and the total number of the teeth of the second gear 540 (i.e., n2) may be different from each other, and/or the distance between two adjacent teeth 511 of the first rack 510 (i.e., d1) and the distance between two adjacent teeth 524 of the second rack 520 (i.e., d2) may be different from each other.

Here, the second movement distance L2 may be any distance smaller than the first movement distance L1. In one embodiment, the second movement distance L2 may be any distance in the range of 0.8 to 0.99 times the first movement distance L1.

Accordingly, the movement rate of the second rack 520 in the first direction (X direction) or in the opposite direction of the first direction (X direction) may be smaller than the movement rate of the first rack 510 in the first direction (X direction) or in the opposite direction of the first direction (X direction).

With regard to this, the operation of the flexible display device 1 according to the embodiment of the present disclosure will now be described below.

In the flexible display device 1 according to the embodiment of the present disclosure, the driving motor 570 may operate such that the state of the flexible display device 1 is shifted from the first state to the second state. Referring to FIG. 11a, the first gear 530 may be rotated clockwise by an operation of the driving motor 570, and the first rack 510 engaging with the first gear 530 may be moved in the first direction (X direction).

In addition, referring to FIG. 12a, the second gear 540 may be rotated clockwise by the operation of the driving motor 570, and a portion of the second rack 520 that engages with the second gear 540 may be moved in the first direction (X direction). The second coupling portion 522 may move in the first direction (X direction), the first coupling portion 521 may move in the opposite direction of the first direction (X direction), and the second rack 520 may move and turn clockwise.

When the second body 200b moves from the first position to the second position, the surface area of the portion of the second region 320 that forms a single plane surface with the first region 310 may gradually increase, and at this time, the movement rate of the second rack 520 may be smaller than the movement rate of the first rack 510. Therefore, the amount of movement of each portion of the flexible display 300 may be different from each other. That is, the amount of movement of the portion of the second connected region 322 that moves in the opposite direction of the first direction (X direction) may be smaller than the amount of movement of the portion of the first region 310 that moves in the first direction (X direction).

Accordingly, when the surface area of the portion of the second region 320 that forms a single plane surface with the first region 310 increases, the tension applied to the flexible display 300 may gradually increase.

The amount of tension required for the flexible display 300 to be stably spread without being loosened may vary depending on the size (or surface area) of the flexible display 300. When the surface area of the portion of the flexible display 300 that forms a single plane surface increases, the amount of the tension required may increase. This requirement may be achieved in the flexible display device 1 according to the embodiment of the present disclosure.

In the flexible display device 1 according to the embodiment of the present disclosure, the driving motor 570 may operate such that the state of the flexible display device 1 is shifted from the second state to the first state. Referring to FIG. 11b, the first gear 530 may be rotated counterclockwise by an operation of the driving motor 570, and the first rack 510 engaging with the first gear 530 may be moved in the opposite direction of the first direction (X direction).

In addition, referring to FIG. 12b, the second gear 540 may be rotated counterclockwise by the operation of the driving motor 570, and the portion of the second rack 520 that engages with the second gear 540 may be moved in the opposite direction of the first direction (X direction). As a result, the second coupling portion 522 may move in the opposite direction of the first direction (X direction), the first coupling portion 521 may move in the first direction (X direction), and the second rack 520 may move and turn counterclockwise.

When the second body 200b moves from the second position to the first position, the surface area of the portion of the second region 320 that forms a single plane surface with the first region 310 may gradually decrease, and at this time, the movement rate of the second rack 520 may be smaller than the movement rate of the first rack 510. Therefore, the amount of movement of each portion of the flexible display 300 may be different from each other. That is, the amount of movement of the portion of the second connected region 322 that moves in the first direction (X direction) may be smaller than the amount of movement of the portion of the first region 310 that moves in the opposite direction of the first direction (X direction).

Accordingly, when the surface area of the portion of the flexible display 300 that forms a single plane surface decreases, the tension applied to the flexible display 300 may gradually decrease.

Unlike the embodiments of the present disclosure, when the tension applied to the flexible display 300 is maintained to be relatively high while the state of the flexible display device 1 is shifted from the second state to the first state, a relatively high friction may occur between each element. For example, an unnecessary friction may occur or increase between the flexible display 300 and the first support body 400, between the second rack 520 and the second support body 590, between the first gear 530 and the first rack 510, and between the second gear 540 and the second rack 520.

Such frictions may apply a relatively heavy load when the flexible display 300 is deformed. Therefore, such a load is required to be reduced.

In the flexible display device 1 according to the embodiments of the present disclosure, such a load may be reduced, and the state of the flexible display device 1 may be stably shifted from the second state to the first state.

While specific exemplary embodiments of the present disclosure are described above and illustrated, it will be understood by those skilled in the art that the present disclosure is not limited to the described exemplary embodiments, and various changes and modifications may be made to the present disclosure without departing from the spirit and the scope of the present disclosure. Therefore, the scope of the present disclosure is not limited to the above-described exemplary embodiments, but shall be defined by the technical thought as recited in the following claims.

INDUSTRIAL APPLICABILITY

The flexible display device according to the embodiments of the present disclosure has high industrial applicability, in that when the second body moves relative to the first body between the first position and the second position, the tension required by the flexible display may be continuously applied, and the flexible display device may be stably operated.

What is claimed is:

1. A flexible display device comprising:
a first body;
a second body configured to move between a first position and a second position with respect to the first body in a direction parallel to a first direction;
a flexible display comprising a first region coupled to an outer side of the second body and a second region extending from the first region, wherein a portion of the second region is curved to form a curved surface, wherein the second region is curved about a first axis extending along a second direction orthogonal to the first direction;
a first rack coupled to the second body, wherein teeth are repeatedly formed along the first rack in the direction parallel to the first direction;
a second rack configured to be curved about a second axis parallel to the first axis and form a continuous loop with at least the second region, wherein teeth are repeatedly formed along the second rack in a direction orthogonal to the second direction;
a first gear configured to engage with the teeth of the first rack;
a second gear configured to engage with the teeth of the second rack; and
a driving motor configured to rotate the first gear and the second gear,
wherein the second rack comprises:
a first coupling portion at a first end and coupled to the flexible display;
a second coupling portion at a second end and coupled to the second body; and
a flexible portion between the first coupling portion and the second coupling portion, wherein the teeth of the second rack are formed at the flexible portion.

2. The flexible display device of claim 1, wherein a movement distance of the first rack per rotation of the first gear is the same as a movement distance of the second rack per rotation of the second gear.

3. The flexible display device of claim 1, wherein a movement distance of the second rack per rotation of the second gear is smaller than a movement distance of the first rack per rotation of the first gear.

4. The flexible display device of claim 1, wherein:
the teeth of the first rack are formed on a surface of the first rack opposite to a surface of the first rack to which the second body is coupled;
the teeth of the second rack are formed on an inner surface of the second rack; and
a portion of the second rack including the teeth of the second rack is parallel to the first rack.

5. The flexible display device of claim 1, further comprising:
a first support body configured to support an inner side of a curved portion of the second region, wherein an outer surface of the first support body forms a curved surface; and
a second support body configured to support an inner side of a curved portion of the second rack, wherein an outer surface of the second support body forms a curved surface.

6. The flexible display device of claim 1, further comprising:
a driving bracket coupled to the first body and configured to receive the first rack, the second rack, and the driving motor; and
a driving shaft parallel to the second direction and configured to be rotated by the driving motor to rotate the first gear and the second gear.

7. The flexible display device of claim 6, further comprising a gear reducer received in the driving bracket and configured to transfer driving force of the driving motor to the driving shaft.

8. The flexible display device of claim 6, wherein the driving bracket comprises a second support body formed integrally with the driving bracket and configured to support an inner side of a curved portion the second rack, wherein an outer surface of the second support body forms a curved surface.

9. The flexible display device of claim 6, wherein the driving bracket comprises:
a first guide groove configured to receive the first rack such that the first rack slides through the first guide groove; and
a second guide groove configured to receive the second rack such that the second rack slides through the second guide groove.

10. The flexible display device of claim 1, wherein the first coupling portion laterally protrudes past the flexible portion in the second direction or a direction opposite the second direction.

11. The flexible display device of claim 1, wherein the flexible portion is positioned at a left side or right side with respect to an imaginary center line that bisects the flexible display device along the first direction, and the first coupling portion protrudes past the center line.

12. The flexible display device of claim 1, wherein the first rack coincides with an imaginary center line that bisects the flexible display device along the first direction.

13. The flexible display device of claim 1, further comprising a plurality of support bars parallel to the second direction and configured to support an inner surface of the second region.

14. The flexible display device of claim 13, wherein each of the plurality of support bars comprises:
a first support slider at a first end;
a second support slider at a second end opposite the first end; and
a connection arm between the first support slider and the second support slider and configured to support the second region,
wherein the first body comprises:
a first movement guide groove comprising a U-shaped groove portion and configured to receive the first support slider; and
a second movement guide groove comprising a U-shaped groove portion and configured to receive the second support slider.

15. The flexible display device of claim 1, further comprising a connection frame coupled to the second region along an edge of the second region that is parallel to the second direction, wherein the connection frame couples the flexible display to the second rack.

16. The flexible display device of claim 1, wherein the second region comprises a first connected region adjacent to the first region and a second connected region adjacent to the first connected region,
wherein when the second body is in the first position, the first connected region is curved around the first axis to form a curved surface and a plane of the second connected region is parallel to a plane of the first region, and
wherein when the second body is in the second position, the first connected region is coplanar with the first region and a portion of the second connected region is curved around the first axis to form a curved surface.

17. A flexible display device comprising:
a first body comprising a first support body and a second support body which are spaced apart from each other along a first direction;
a second body configured to move relative to the first body in the first direction or an opposite direction of the first direction;
a flexible display comprising a first region coupled to an outer side of the second body and a second region extending from the first region, wherein a portion of the second region is supported by the first support body and is curved around the first support body;
a first rack coupled to the second body and comprising teeth repeatedly formed along the first rack;
a second rack comprising:
a first coupling portion coupled to an edge of the second region;
a flexible portion adjacent to the first coupling portion configured to curve around and be supported by the second support body; and
a second coupling portion adjacent to the flexible portion and coupled to the second body, wherein teeth are repeatedly formed along the flexible portion;
a first gear configured to engage with the teeth of the first rack;
a second gear configured to engage with the teeth of the second rack; and
a driving shaft coupled to the first gear and the second gear such that the first gear and the second gear are configured to rotate in conjunction with each other.

18. The flexible display device of claim 17, wherein a movement rate of the first rack based on operation of the first gear is the same as a movement rate of the second rack based on operation of the second gear.

19. The flexible display device of claim 17, wherein a rotation rate of the first gear and a rotation rate of the second gear are the same, and wherein n1×d1 is greater than n2×d2, where d1 is defined as a distance between two adjacent teeth of the first rack, d2 is defined as a distance between two adjacent teeth of the second rack, n1 is defined as a total number of teeth of the first gear, and n2 is defined as a total number of teeth of the second gear.

* * * * *